US008374349B2

(12) United States Patent
Anan et al.

(10) Patent No.: US 8,374,349 B2
(45) Date of Patent: Feb. 12, 2013

(54) IMAGE ENCRYPTION APPARATUS AND IMAGE DECRYPTION APPARATUS

(75) Inventors: Taizo Anan, Kawasaki (JP); Shohei Nakagata, Kawasaki (JP); Kensuke Kuraki, Kawasaki (JP); Jun Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1023 days.

(21) Appl. No.: 12/393,381

(22) Filed: Feb. 26, 2009

(65) Prior Publication Data

US 2009/0238361 A1 Sep. 24, 2009

(30) Foreign Application Priority Data

Mar. 24, 2008 (JP) ................................. 2008-076129

(51) Int. Cl.
*G06F 21/00* (2006.01)
(52) U.S. Cl. ......... 380/246; 382/257; 382/275; 348/576
(58) Field of Classification Search .................. 380/243, 380/246; 382/275; 348/576, 589
See application file for complete search history.

(56) References Cited

U.S. PATENT DOCUMENTS

| | | | |
|---|---|---|---|
| 5,321,749 A | 6/1994 | Virga | |
| 5,491,563 A | 2/1996 | Pomerantz | |
| 6,118,872 A | 9/2000 | Kashima et al. | |
| 6,839,844 B1 | 1/2005 | Okano | |
| 2003/0198403 A1* | 10/2003 | Ottesen | 382/280 |
| 2004/0135906 A1* | 7/2004 | Okada | 348/239 |
| 2006/0013479 A1* | 1/2006 | Trimeche et al. | 382/167 |

FOREIGN PATENT DOCUMENTS

| | | |
|---|---|---|
| JP | 2938338 | 6/1999 |
| JP | 2004-007100 | 1/2004 |
| JP | 2004-222253 | 8/2004 |
| JP | 2007-194962 | 8/2007 |
| JP | 2008-301044 | 12/2008 |
| WO | WO 2006028103 A1 * | 3/2006 |

OTHER PUBLICATIONS

Liu, "Efficient selective encryption for JPEG 2000 images using private initial table," Pattern Recognition vol. 39, Issue 8, Aug. 2006, pp. 1509-1517.*
U.S. Appl. No. 12/129,266, filed May 29, 2008, Shohei Nakagata, et al., Fujitsu Limited.
Japanese Office Action for corresponding Japanese Application 2008-076129; mailed Jan. 10, 2012.
European Search Report for corresponding European Application 09003030.5-2415; dated Oct. 29, 2009.

* cited by examiner

*Primary Examiner* — Kambiz Zand
*Assistant Examiner* — Michael Guirguis
(74) *Attorney, Agent, or Firm* — Staas & Halsey LLP

(57) ABSTRACT

In an image encryption apparatus, an input processor inputs data of an input image. An encryptor encrypts a part or whole of the data of the input image. A marker generator generates data of a marker indicating an encrypted area. An image saver saves data of a marker-covered image covered with the marker. A marker sticker sticks the marker. An output processor outputs an encrypted image. In an image decryption apparatus, an input processor inputs data of an input image. A marker detector detects a marker and identifies an encrypted area. A decryptor decrypts data in the encrypted area. An image restorer restores data in an area covered with the marker by sticking data of a marker-covered image. An output processor outputs data of a decrypted image.

16 Claims, 33 Drawing Sheets

| COORDINATES OF 2701 | PIXEL VALUE OF 2701 | PIXEL VALUE OF 2702 | ... | PIXEL VALUE OF 2707 |

| COORDINATES OF 2708 | PIXEL VALUE OF 2708 | PIXEL VALUE OF 2709 | ... | PIXEL VALUE OF 2714 |

| COORDINATES OF 2715 | PIXEL VALUE OF 2715 | PIXEL VALUE OF 2716 | ... | PIXEL VALUE OF 2721 |

| COORDINATES OF 2722 | PIXEL VALUE OF 2722 | PIXEL VALUE OF 2723 | ... | PIXEL VALUE OF 2728 |

Fig. 28

| ADDRESS | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 00000000 | 42 | 4D | 06 | 3F | 74 | 01 | 00 | 00 | 00 | 00 | 36 | 00 | 00 | 00 | 28 | 00 |
| 00000010 | 00 | 00 | 4F | 09 | 00 | 00 | 53 | 0D | 00 | 00 | 01 | 00 | 18 | 00 | 00 | 00 |
| 00000020 | 00 | 00 | D0 | 3E | 74 | 01 | 1F | 2E | 00 | 00 | 1F | 2E | 00 | 00 | 00 | 00 |
| 00000030 | 00 | 00 | 00 | 00 | 00 | 00 | 00 | 00 | FF | FF | FF | FF | FF | FF | FF | FF |
| ... | | | | | | | | | IMAGE DATA | | | | | | | |
| 01743EE0 | FF | FF | FF | FF | FF | FF | FF | FF | FF | FF | FF | FF | FF | FF | FF | FF |
| 01743EF0 | FF | FF | FF | FF | FF | FF | FF | FF | FF | FF | FF | FF | FF | FF | FF | FF |
| 01743F00 | FF | FF | FF | 00 | 00 | 00 | | | | | | | | | | |

Fig. 30A

| ADDRESS | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 00000000 | 42 | 4D | AC | 49 | 74 | 01 | 00 | 00 | 00 | 00 | 36 | 00 | 00 | 00 | 28 | 00 |
| 00000010 | 00 | 00 | 4F | 09 | 00 | 00 | 53 | 0D | 00 | 00 | 01 | 00 | 18 | 00 | 00 | 00 |
| 00000020 | 00 | 00 | D0 | 3E | 74 | 01 | 1F | 2E | 00 | 00 | 1F | 2E | 00 | 00 | 00 | 00 |
| 00000030 | 00 | 00 | 00 | 00 | 00 | 00 | 00 | 00 | FF | FF | FF | FF | FF | FF | FF | FF |
| ... | | | | | | | | | IMAGE DATA | | | | | | | |
| 01743EE0 | FF | FF | FF | FF | FF | FF | FF | FF | FF | FF | FF | FF | FF | FF | FF | FF |
| 01743EF0 | FF | FF | FF | FF | FF | FF | FF | FF | FF | FF | FF | FF | FF | FF | FF | FF |
| 01743F00 | FF | FF | FF | 00 | 00 | 00 | A6 | 0A | 00 | 00 | 01 | 00 | 00 | C0 | 00 | 00 |
| 01743F10 | 30 | 01 | 68 | 02 | A0 | 02 | 0C | C1 | 75 | B9 | C0 | F1 | B6 | A8 | 81 | C3 |
| 01743F20 | 99 | B2 | 69 | 77 | 26 | 61 | 05 | 00 | 00 | 00 | A0 | 02 | FF | FF | FF | FF |

Fig. 30B

IMAGE ENCRYPTION APPARATUS AND IMAGE DECRYPTION APPARATUS

CROSS-REFERENCE TO RELATED APPLICATIONS

This application is based upon and claims the benefit of priority of the prior Japanese Patent Application No. 2008-76129, filed on Mar. 24, 2008, the entire contents of which are incorporated herein by reference.

FIELD

The embodiments discussed herein are related to a technique for indicating, with markers, a specific area where encrypted or encoded data is placed on a printed matter or an image.

BACKGROUND

Techniques for indicating a specific area on a printed matter with markers have been devised.

For example, Japanese Patent No. 2938338 discusses a two dimension code which is encoded from some data and stuck to a printed matter. A URL (Uniform Resource Locator), for example, is encoded into a two dimension code, and a reader for reading and processing two dimension codes restores original data from the two dimension code. In this case, the reader may find the position of the two dimension code by reading markers arranged at corners of the two dimension code.

SUMMARY

According to an aspect of the present invention, provided is an image encryption apparatus for encrypting image data. The image encryption apparatus includes an input processor, an encryptor, a marker generator, an image saver, a marker sticker, and an output processor. The input processor accepts data of an input image to be encrypted. The encryptor encrypts data in a predefined encryption area of the input image to generate data of a first encrypted image. The first encrypted image is the input image whose data in the predefined encryption area has been replaced with encrypted data. The marker generator generates data of a marker to be stuck on the first encrypted image. The marker is capable of indicating the predefined encryption area of the first encrypted image. The image saver saves data of a part of the first encrypted image where the marker is to be stuck. The marker sticker generates data of a second encrypted image. The second encrypted image is the first encrypted image whose data in the part has been replaced with the data of the marker. The output processor outputs the data of the second encrypted image.

According to another aspect of the present invention, provided is an image decryption apparatus for decrypting image data. The image decryption apparatus includes an input processor, a marker detector, a decryptor, an image restorer, and an output processor. The input processor accepts data of an input image to be decrypted. The marker detector detects a marker stuck on the input image and identifies an encrypted area of the input image on the basis of a detected marker. The decryptor decrypts data in the encrypted area of the input image to generate data of a first decrypted image. The first decrypted image is the input image whose data in the encrypted area has been replaced with decrypted data. The image restorer generates data of a second decrypted image. The second decrypted image is the first decrypted image whose data in an area covered with the marker has been restored. The output processor outputs the data of the second decrypted image.

The object and advantages of the present invention will be realized and attained by means of the elements and combinations particularly pointed out in the claims.

It is to be understood that both the foregoing general description and the following detailed description are exemplary and explanatory and are not restrictive of the present invention, as claimed.

BRIEF DESCRIPTION OF THE DRAWINGS

FIG. 28 is a diagram illustrating an example of data arrangement of marker-covered images stored in a digital image file;

FIGS. 30A and 30B are diagrams illustrating an example in which data illustrated in FIG. 28 is embedded in a bitmap file;

DESCRIPTION OF EMBODIMENTS

Japanese Laid-open Patent Publication No. 2008-301044 applied by the applicant of the present invention discusses a technique for encrypting data on a printed matter and sticking markers indicating an encrypted area at four corners thereof. Similarly to the two dimension code, a reader acquires coordinates of the encrypted area by detecting the markers arranged around the encrypted area, which makes it possible to perform a decryption process.

Figure 31:
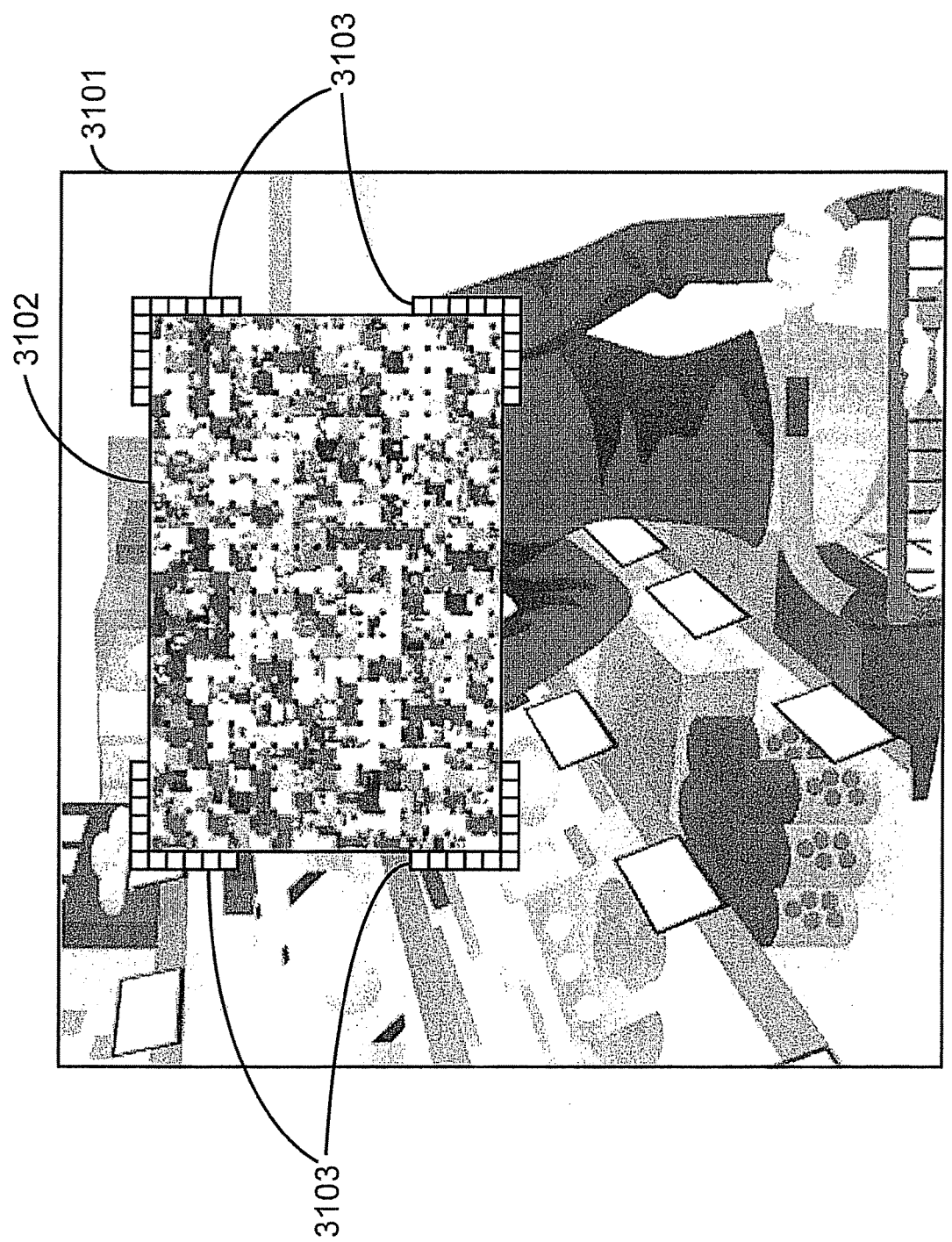
FIG. 31 is a diagram illustrating an image encrypted by an encryption method discussed in Japanese Laid-open Patent Publication No. 2008-301044.
Figure 32:
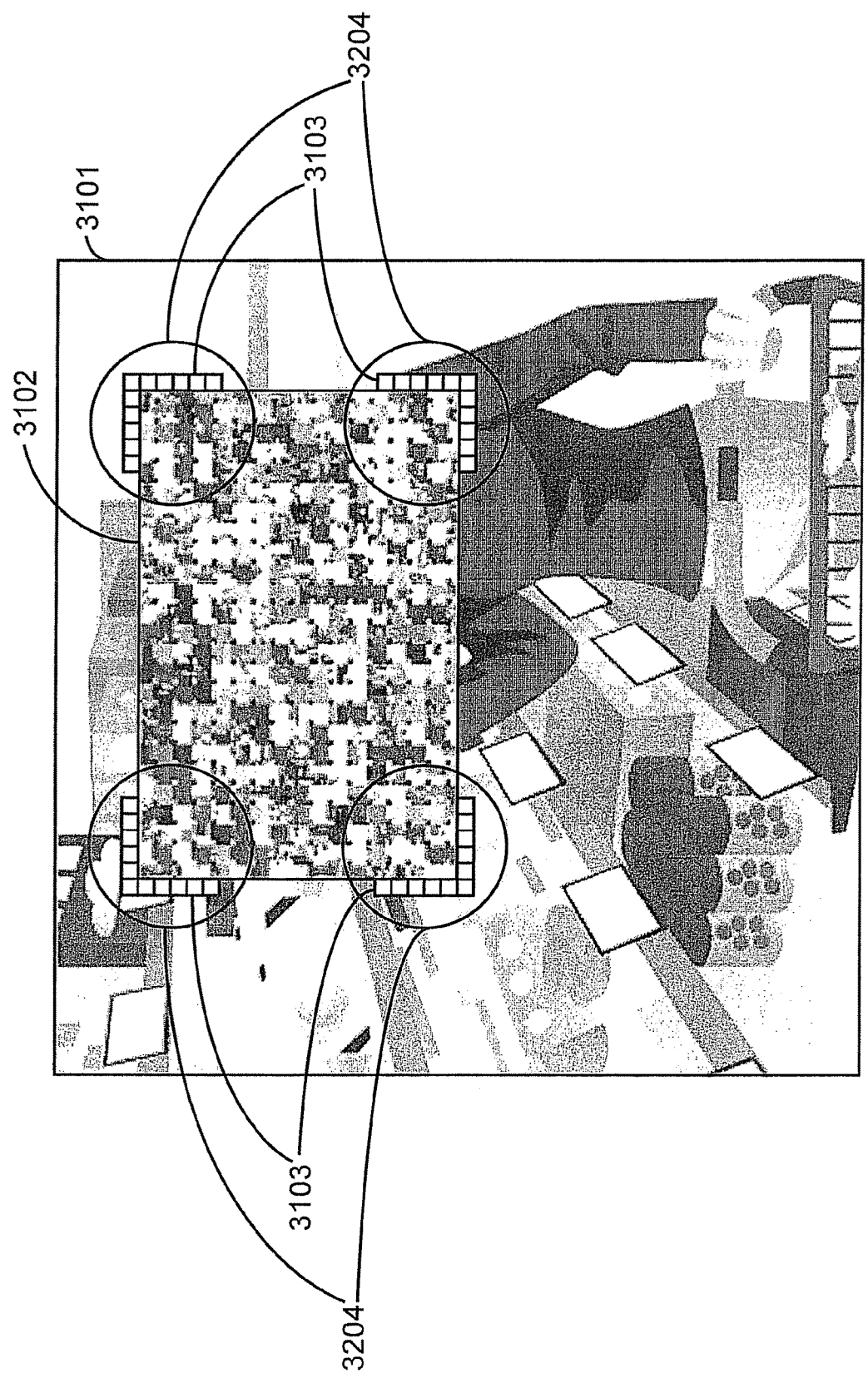
FIG. 32 is a diagram illustrating an operation in decrypting the image illustrated in FIG. 31.
Figure 33:
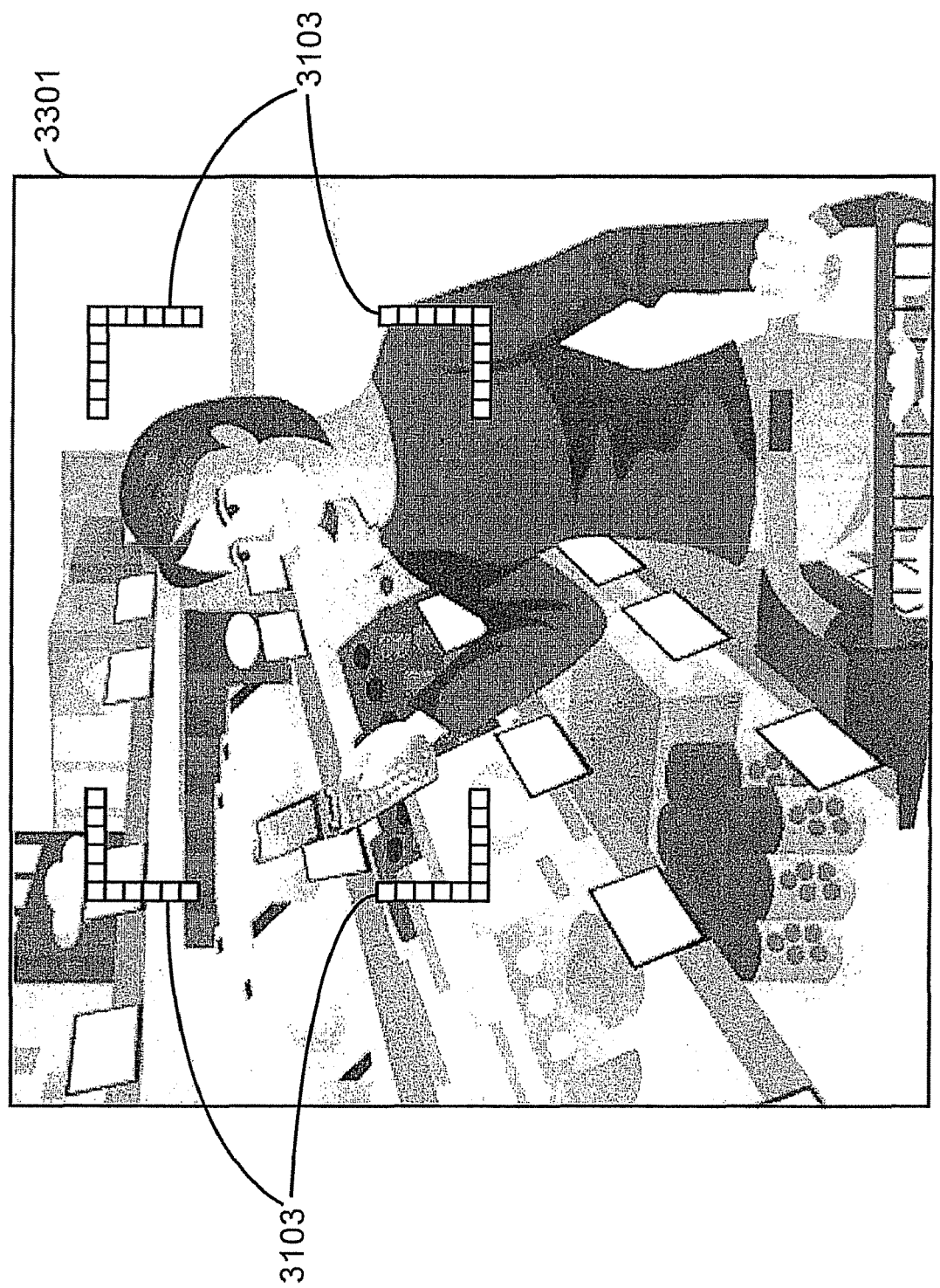
FIG. 33 is a diagram illustrating an image resulted from decryption of the image illustrated in FIG. 31.

FIG. 31 is a diagram illustrating an image encrypted by an encryption method discussed in Japanese Laid-open Patent Publication No. 2008-301044. As illustrated in FIG. 31, graphics 3103 called markers indicating coordinate positions are stuck at each of the four corners of the encrypted area 3102 in the encrypted image 3101. FIG. 32 is a diagram illustrating an operation in decrypting the image illustrated in FIG. 31. In the decryption method discussed in Japanese Laid-open Patent Publication No. 2008-301044, the markers arranged at the four corners of the encrypted area are detected first as illustrated with circles 3204 in FIG. 32, and then, the position of the encrypted area is identified. Then, a decryption process is applied on the identified area. FIG. 33 is a diagram illustrating an image resulted from decryption of the image illustrated in FIG. 31. As illustrated in FIG. 33, the markers 3103 are remained in the decrypted image 3301. That is, images (hereinafter referred to marker-covered images) covered with the markers are lost. The method discussed in Japanese Laid-open Patent Publication No. 2008-301044 has weakness in that, when applied to an image having important information behind the markers, it is necessary to take care of positions at which the markers are stuck. Embodiments of the present invention relates to an apparatus that may overcome the weakness in processing the markers.

Hereinafter, embodiments of the present invention will be discussed in detail with reference to the accompanying drawings. Like reference number denotes like element in the drawings.

As an encryption system, for example, the technique discussed in Japanese Laid-open Patent Publication No. 2008-301044 may be employed. Alternatively, a known common key encryption system such as AES (Advanced Encryption Standard), DES (Data Encryption Standard), or the like may be employed.

The embodiments of the present invention relates to a marker for indicating an encrypted area, which makes it possible that an original image before encryption is perfectly or approximately restored by decrypting the encrypted image, eliminating the markers from the decrypted image (for example, FIG. 33), and restoring marker-covered images which has been lost in the time of encryption.

First Embodiment

Image Encryption Apparatus in View of Marker Sticking

Figure 1:
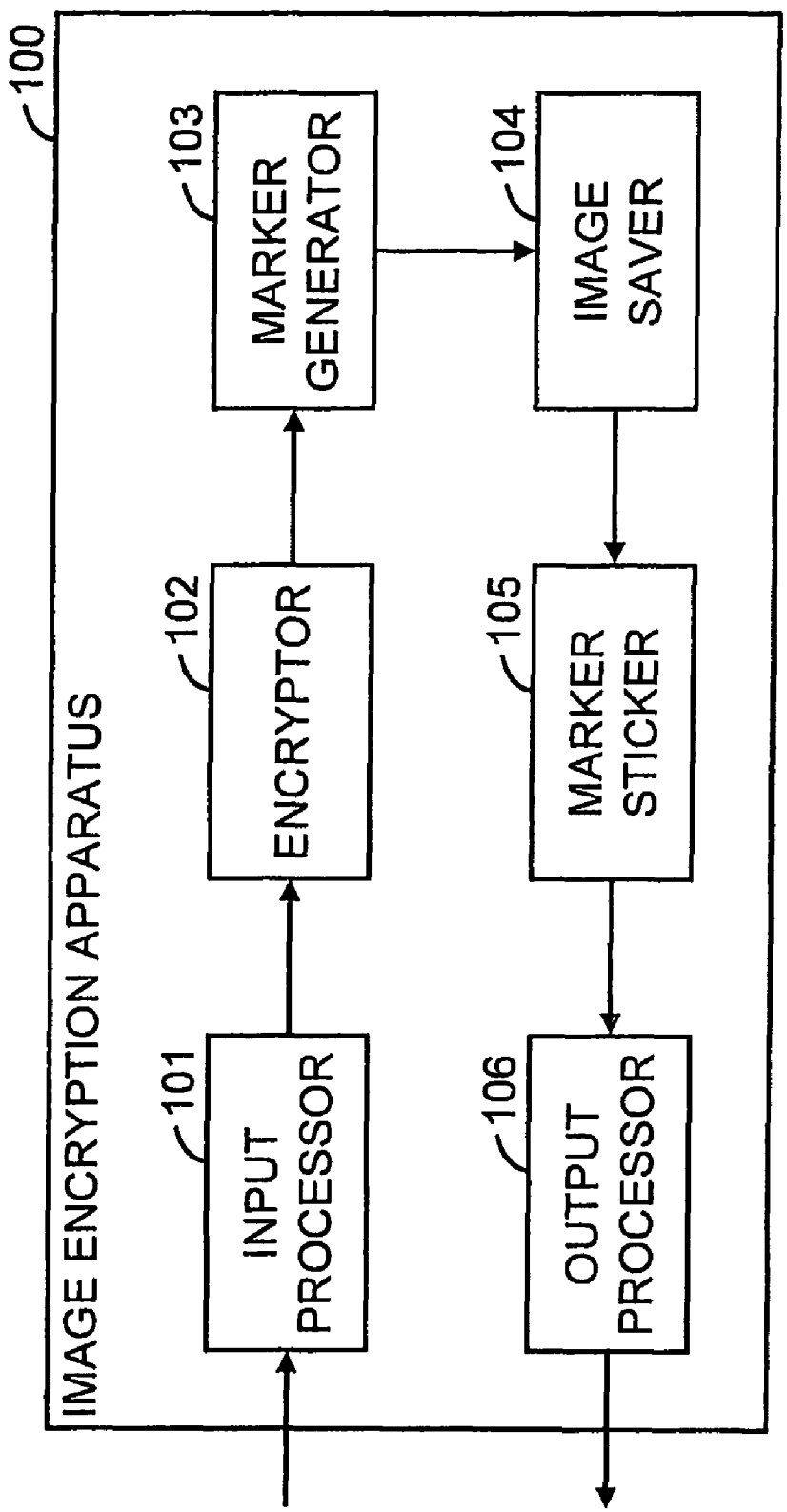
FIG. 1 is a diagram illustrating a system configuration of a first image encryption apparatus according to a first embodiment of the present invention.

FIG. 1 is a diagram illustrating a system configuration of a first image encryption apparatus according to a first embodiment of the present invention. The first image encryption apparatus makes it possible to restore an image covered with a marker. As illustrated in FIG. 1, the first image encryption apparatus 100 includes an input processor 101, an encryptor 102, a marker generator 103, an image saver 104, a marker sticker 105, and an output processor 106.

Figure 3:
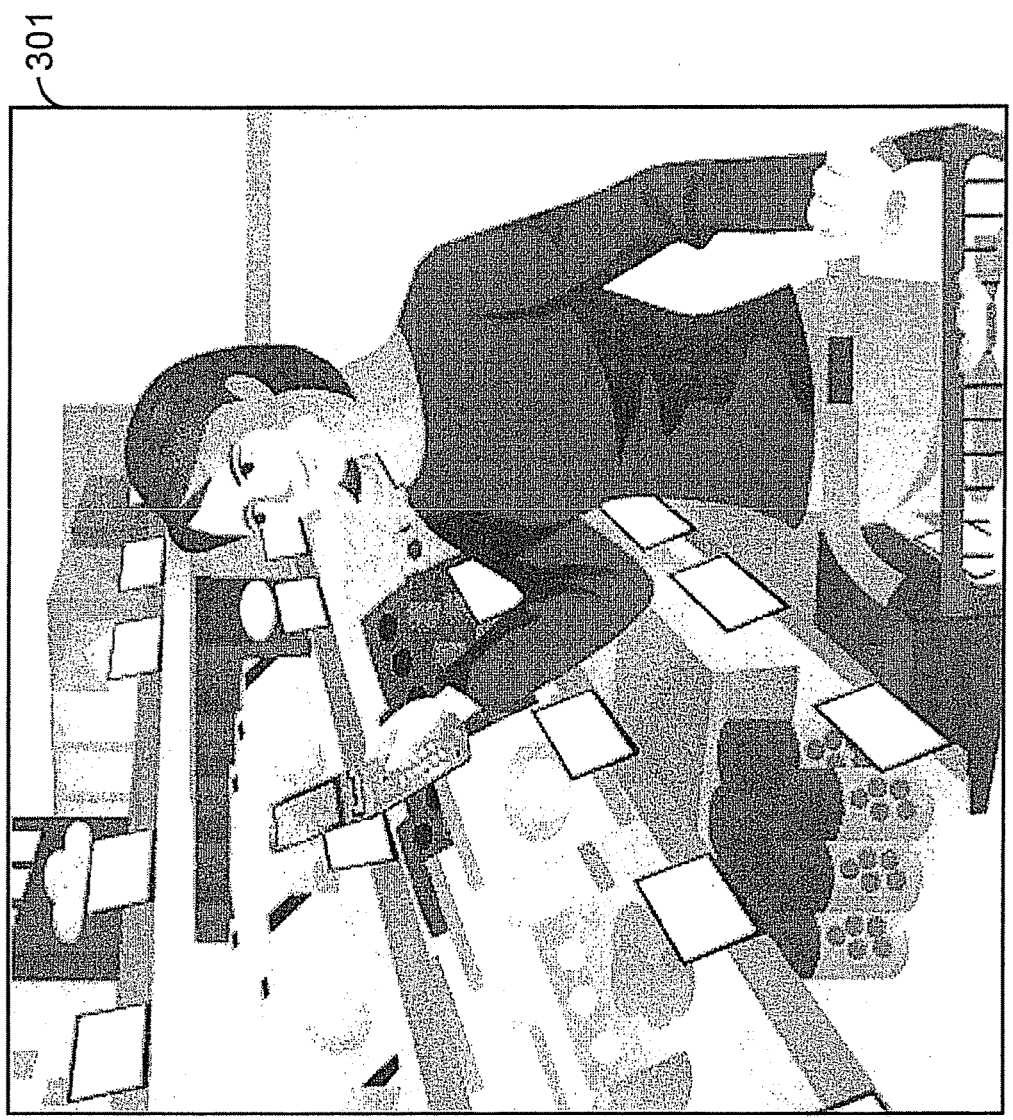
FIG. 3 is a diagram illustrating an example of an original image according to a first embodiment of the present invention.

The input processor 101 takes image data as input data. The image data may be converted from data of an electronic document or from data in an encryption area within an electronic document. Alternatively, the image data may be obtained by scanning a printed matter with an apparatus such as a scanner and an MFP (multifunction printer), or may be image data itself imaged by a digital camera or the like. FIG. 3 is a diagram illustrating an example of an original image according to a first embodiment of the present invention. Data of an original image 301 is taken into the input processor 101.

Figure 4:
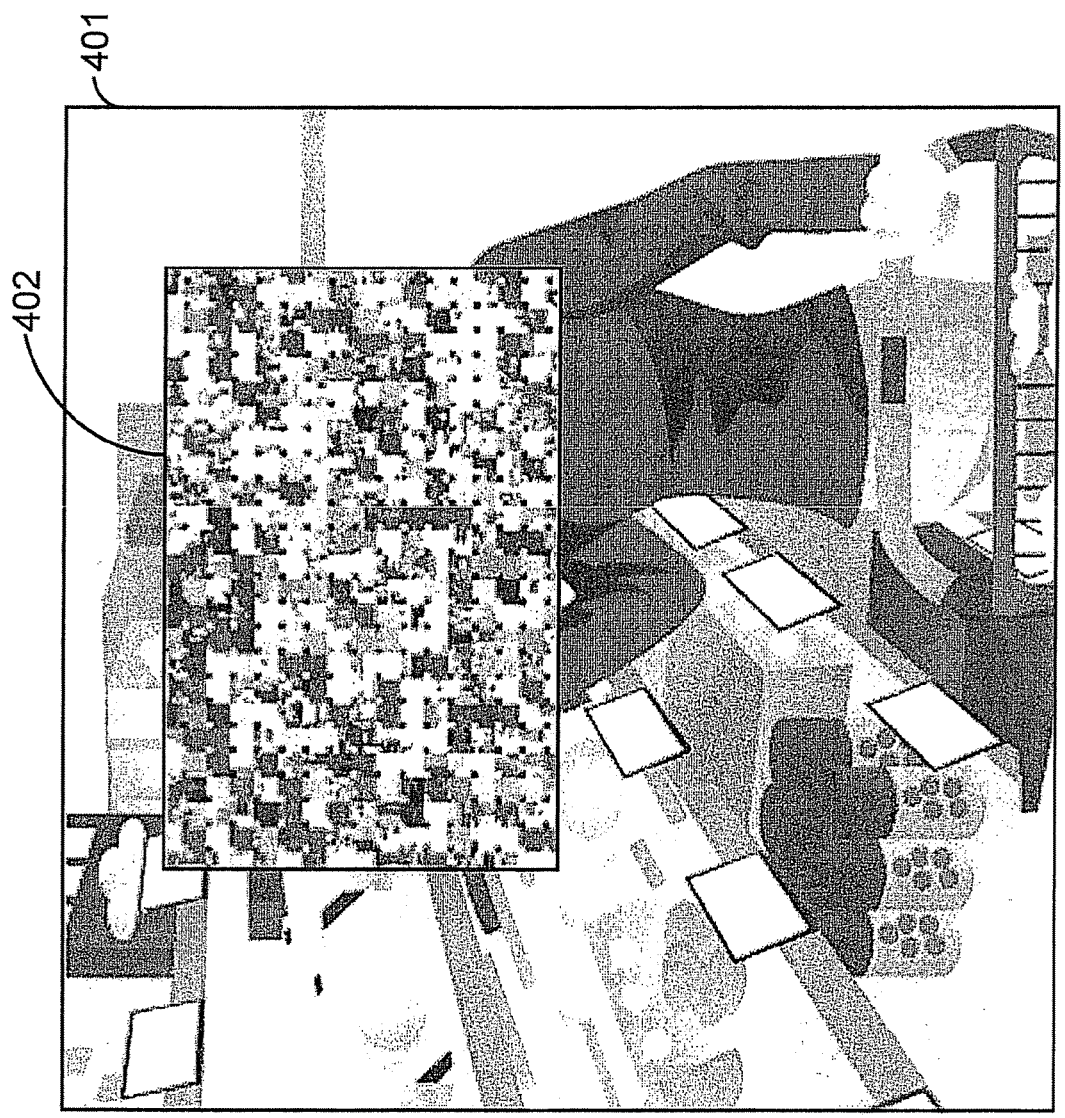
FIG. 4 is a diagram illustrating an example of an image encrypted by an encryptor of a first image encryption apparatus according to a first embodiment of the present invention.

The encryptor 102 encrypts image data input by the input processor 101. The encryption method may be, for example, the encryption method discussed in Japanese Laid-open Patent Publication No. 2008-301044 or a known encryption method such as AES and DES. FIG. 4 is a diagram illustrating an example of an image encrypted by an encryptor of a first image encryption apparatus according to a first embodiment of the present invention. As illustrated in FIG. 4, the original image 301 is converted, with an encryption method discussed in Japanese Laid-open Patent Publication No. 2008-301044, into an encrypted image 401 having an encrypted area 402.

Figure 5:
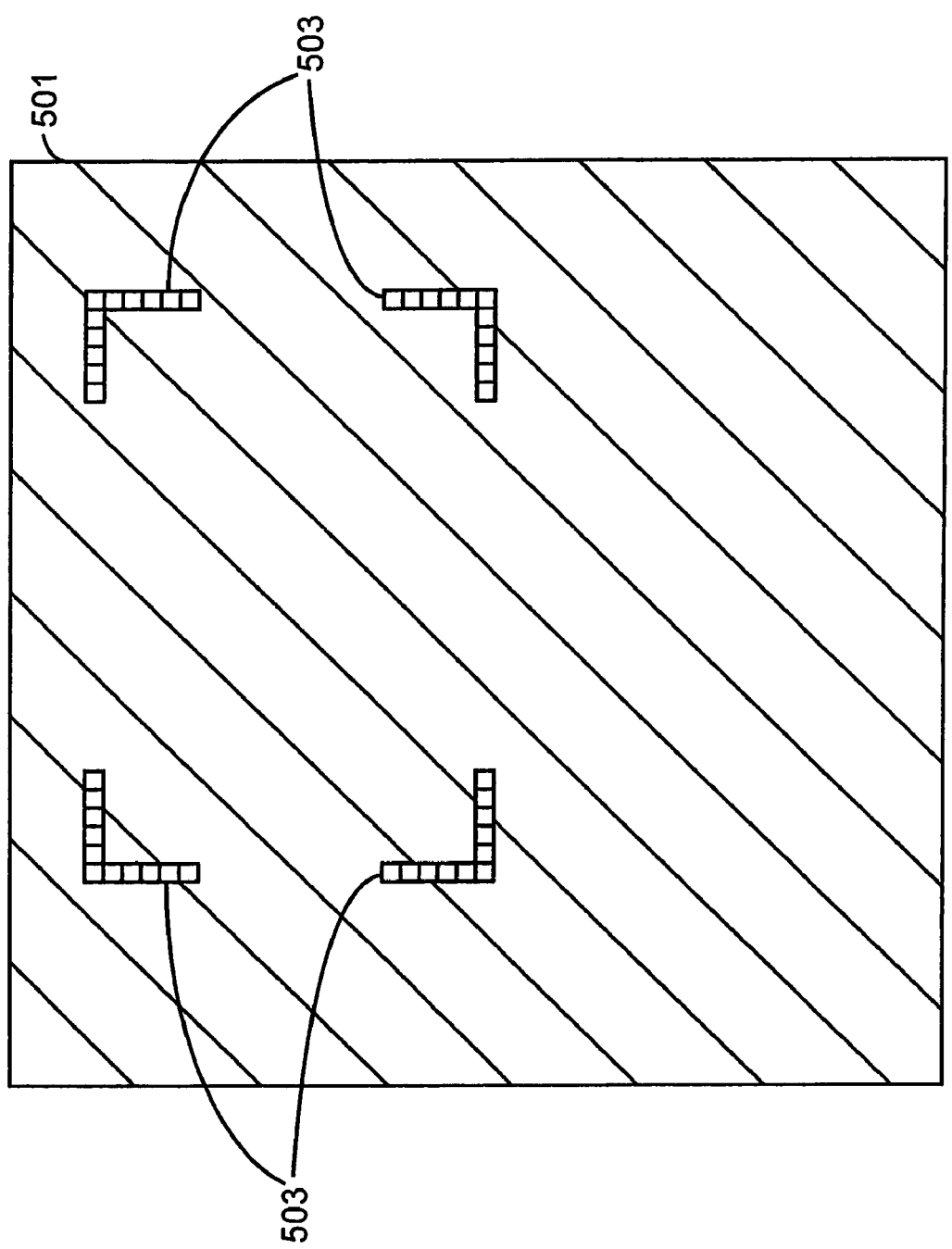
FIG. 5 is a diagram illustrating an example of markers according to a first embodiment of the present invention.

The marker generator 103 generates markers for indicating the position of the encrypted area 402 encrypted by the encryptor 102. FIG. 5 is a diagram illustrating an example of markers according to a first embodiment of the present invention. As illustrated in FIG. 5, the marker generator 103 generates markers 503 at points corresponding to four corners of the encrypted area 402 within whole area 501 of the original image 301.

Figure 6:
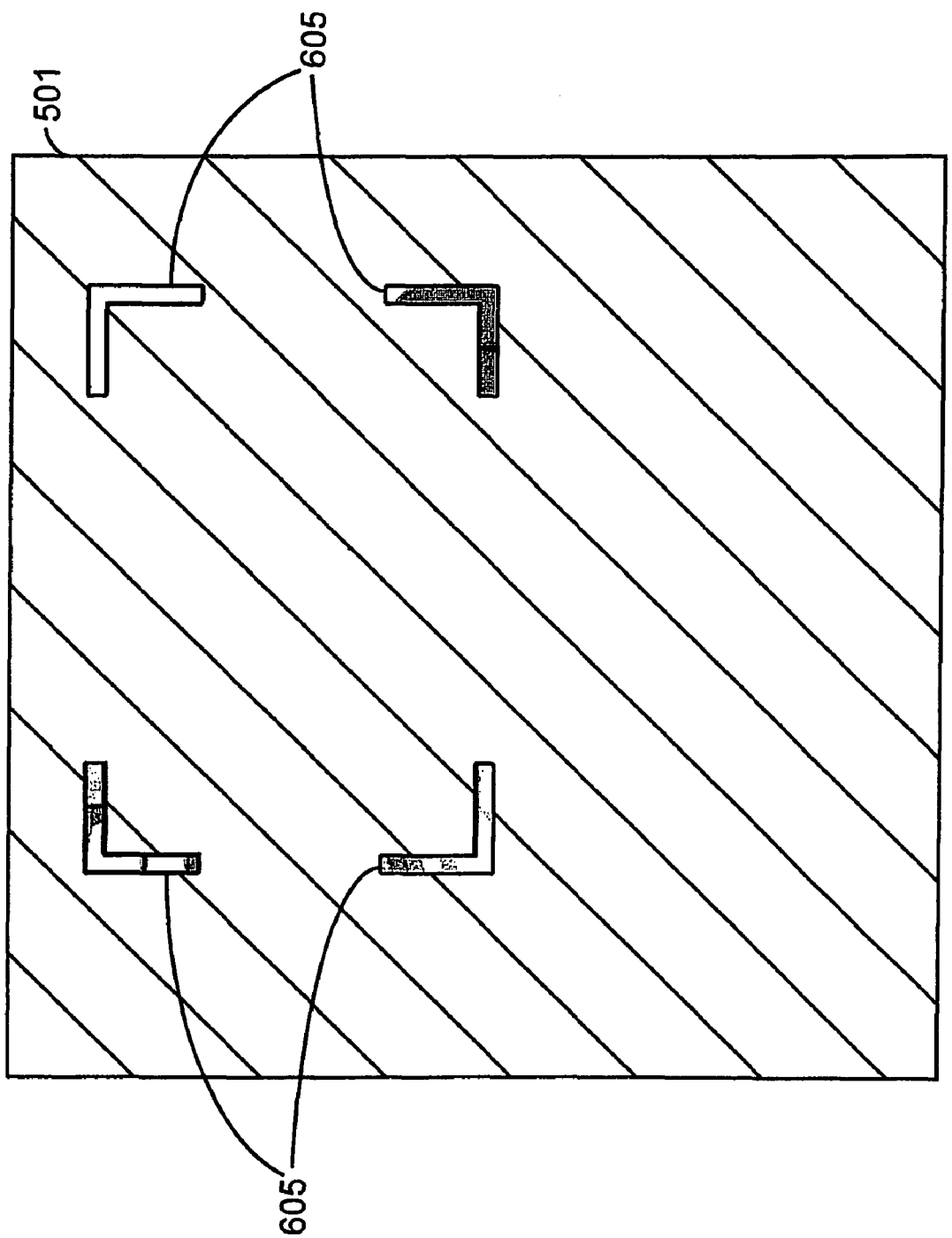
FIG. 6 is a diagram illustrating an example of marker-covered images according to a first embodiment of the present invention.

Before generated markers are stuck to the encrypted image 401, the image saver 104 saves, to a file or a header of an image file, data of marker-covered images, that is, the original image 301 within areas where the generated markers to be stuck. At this time, the coordinates indicating the positions of the marker-covered images (that is, coordinates indicating positions where the markers are stuck) may also be saved to a file or a header of an image file in order to be used in decryption, as illustrated in FIG. 28 discussed later. FIG. 6 is a diagram illustrating an example of marker-covered images according to a first embodiment of the present invention. As illustrated in FIG. 6, the image saver 104 saves image data of marker-covered images 605 within areas where the generated markers to be stuck.

Figure 7:
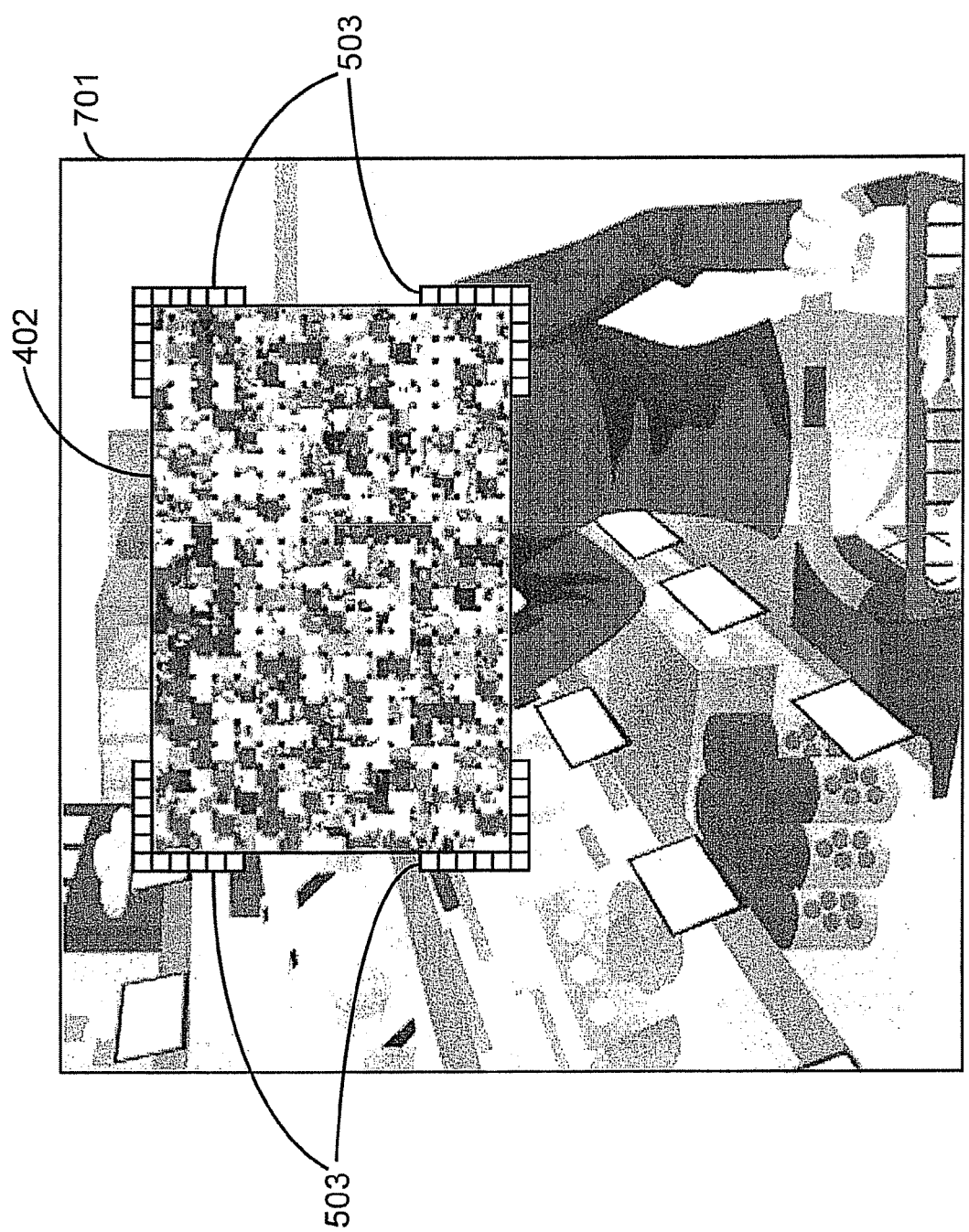
FIG. 7 is a diagram illustrating an example of a marked encrypted image according to a first embodiment of the present invention.

Then, the marker sticker 105 sticks the markers 503 to the encrypted image 401. FIG. 7 is a diagram illustrating an example of a marked encrypted image according to a first embodiment of the present invention. As illustrated in FIG. 7, the encrypted image 401 is converted into a marked encrypted image 701 having the encrypted area 402 and the markers 503.

The marked encrypted image 701 is, for example, electrically stored in a file or printed on a paper by the output processor 106.

Figure 2:
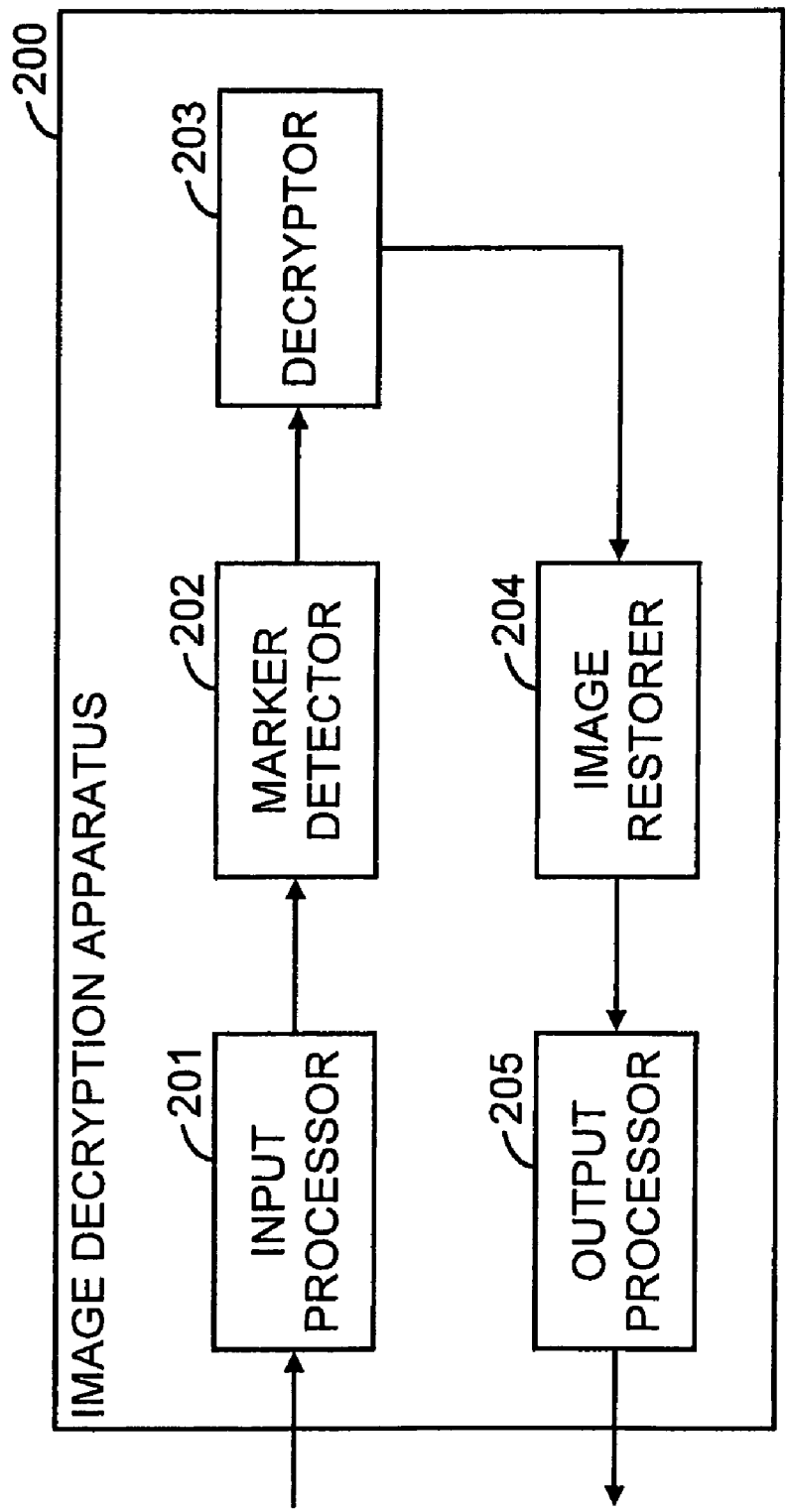
FIG. 2 is a diagram illustrating a system configuration of a first image decryption apparatus according to a first embodiment of the present invention.

Image Decryption Apparatus Having Function for Restoring Image Covered by Marker FIG. 2 is a diagram illustrating a system configuration of a first image decryption apparatus according to a first embodiment of the present invention. The first image decryption apparatus is used for decrypting the marked encrypted image 701 encrypted by and output from the first image encryption apparatus 100. The first image decryption apparatus 200 includes an input processor 201, a marker detector 202, a decryptor 203, an image restorer 204, and an output processor 205.

The input processor 201 takes encrypted image data as input data. Similar to the case of the first image encryption apparatus 100, the encrypted image data may be converted from data of an electronic document or only a part thereof. Alternately, the image data may be obtained by reading a printed encrypted image with a scanner. For example, the marked encrypted image 701 illustrated in FIG. 7 is employed as an input image.

Figure 8:
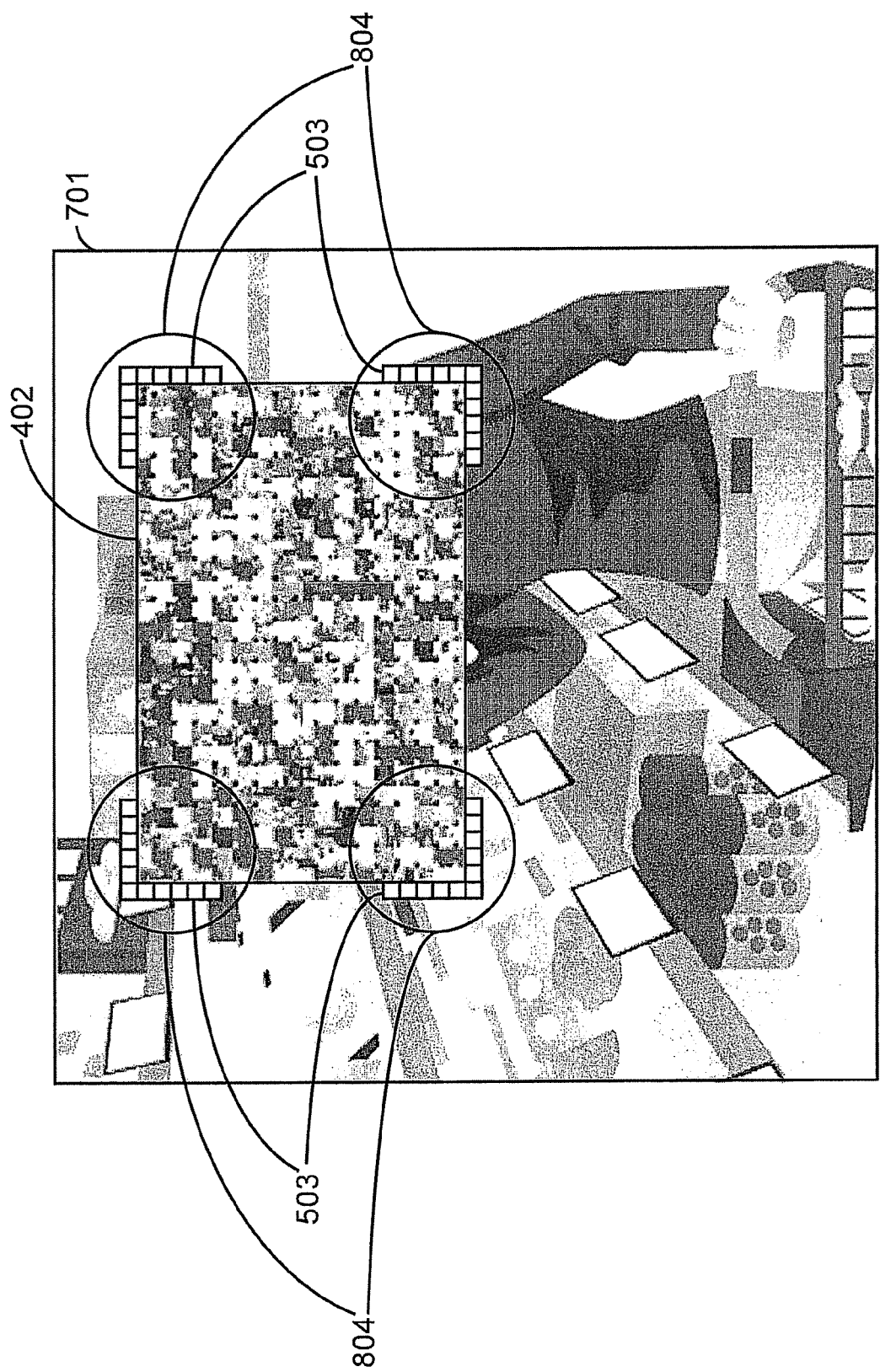
FIG. 8 is a diagram illustrating an operation of detecting markers by a marker detector of a first image decryption apparatus according to a first embodiment of the present invention.

Next, the marker detector 202 detects the markers and identifies the position of the encrypted area 402. FIG. 8 is a diagram illustrating an operation of detecting markers by a marker detector of a first image decryption apparatus according to a first embodiment of the present invention. The marker detector 202 identifies the position of the encrypted area 402 as illustrated with circles 804 in FIG. 8. As the method of marker detection, the method discussed in Japanese Patent No. 2938338 or Japanese Laid-open Patent Publication No. 2008-301044 may be employed. Alternatively, a known method such as a pattern matching and a frequency analysis may be employed. Alternatively, the coordinates of the markers (such as illustrated in FIG. 28 discussed later) saved at the time of encryption may be used.

Figure 9:
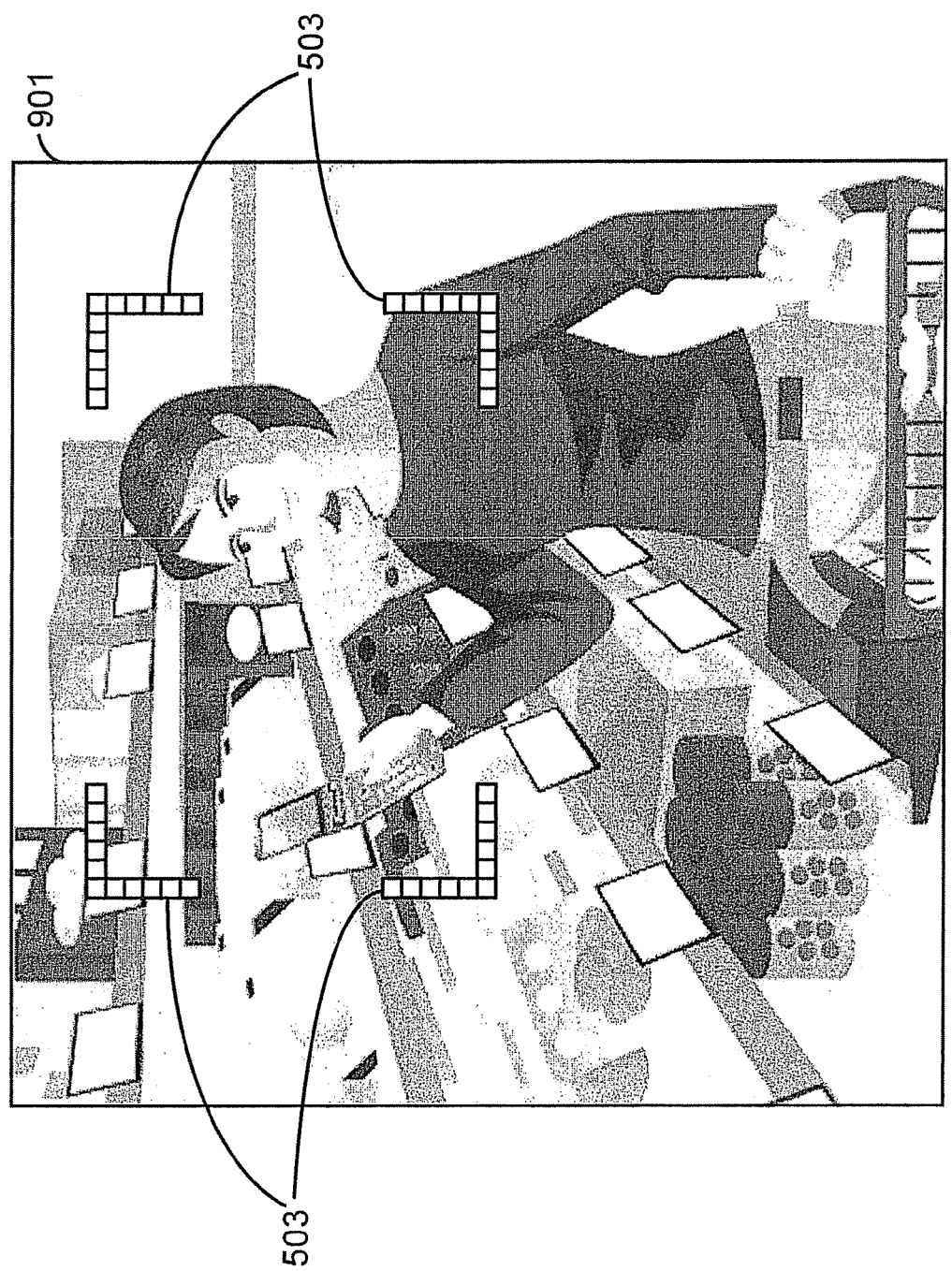
FIG. 9 is a diagram illustrating an example of an image decrypted by a decryptor of a first image decryption apparatus according to a first embodiment of the present invention.

After the position of the encrypted area is identified, the decryptor 203 performs a decryption process to resolve the encryption. FIG. 9 is a diagram illustrating an example of an image decrypted by a decryptor of a first image decryption apparatus according to a first embodiment of the present invention. Although data inside of the encrypted area 402 of a decrypted image 901 is decrypted, the markers 503 are remained outside the encrypted area 402.

The image restorer 204 performs a process for restoring the marker-covered images 605. Image data of the marker-covered images 605, which is saved by the image saver 104 of the first image encryption apparatus 100, is stuck to the decrypted image 901 to cover the markers 503 and the original image 301 is restored.

Finally, the output processor 205 outputs the restored original image 301 by, for example, electrically storing in a file or printing.

Second Embodiment

Image Decryption apparatus for Restoring Approximate Image

Figure 10:
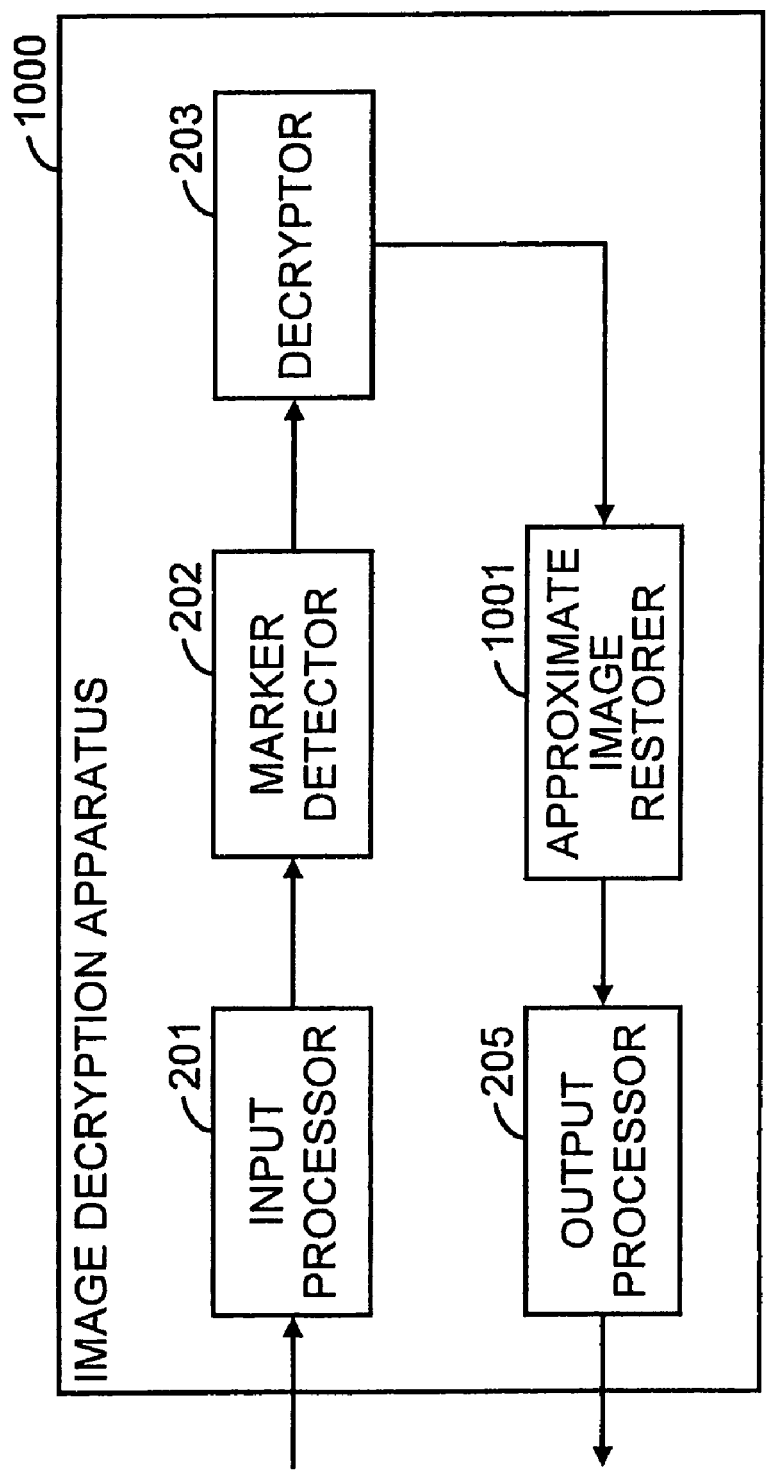
FIG. 10 is a diagram illustrating a system configuration of a second image decryption apparatus according to a second embodiment of the present invention.

As an apparatus for decrypting the marked encrypted image 701 illustrated in FIG. 7, that is encrypted by and output from the first image encryption apparatus 100, a second image decryption apparatus may be used similarly to the first image decryption apparatus 200. FIG. 10 is a diagram illustrating a system configuration of a second image decryption apparatus according to a second embodiment of the present invention.

Figure 12:
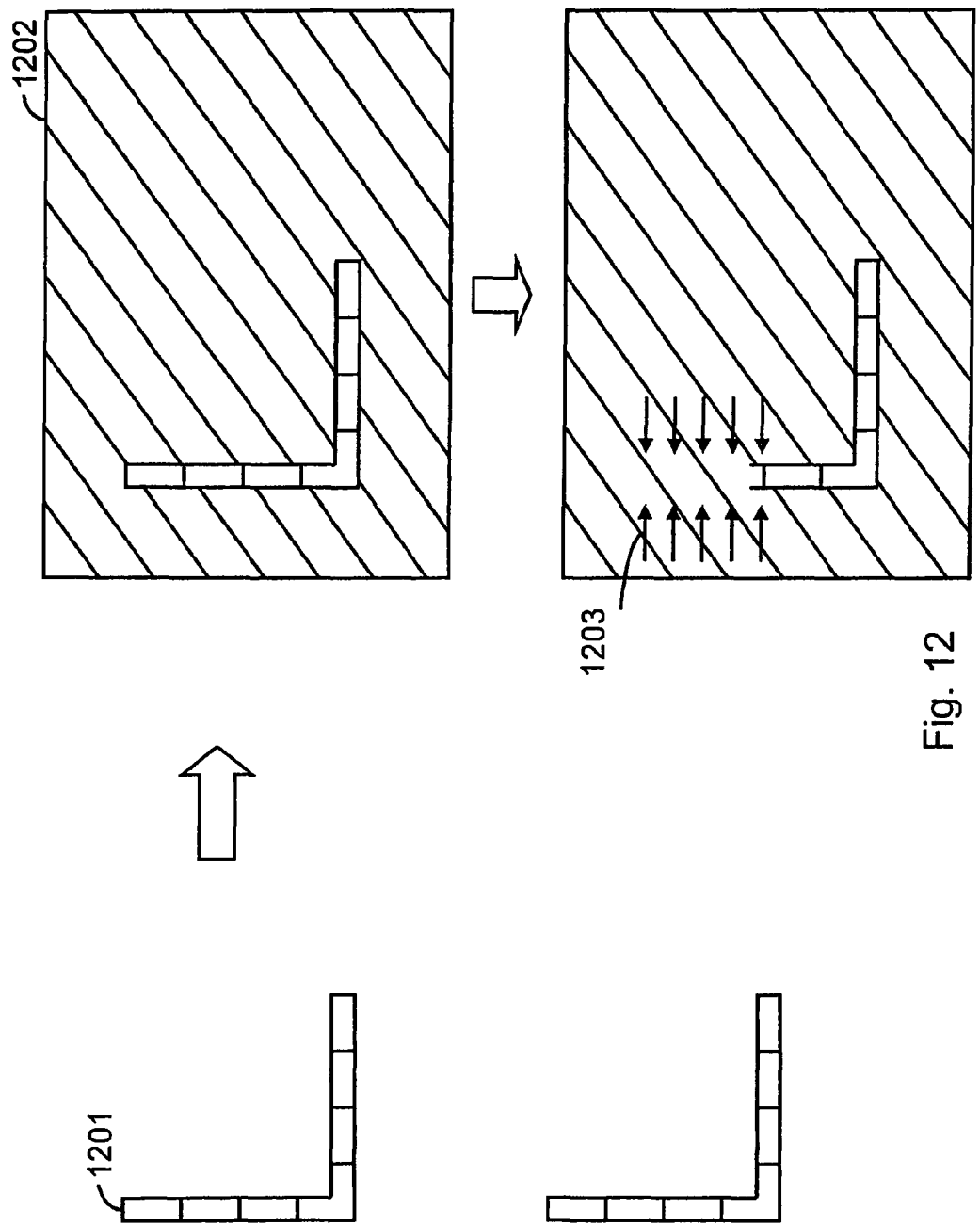
FIG. 12 is a diagram illustrating an example of a marker according to embodiments of the present invention.

As is apparent from FIG. 10, the second image decryption apparatus 1000 is different from the first image decryption apparatus 200 in having an approximate image restorer 1001 instead of the image restorer 204. The approximate image restorer 1001 does not stick the image data of the marker-covered images 605, which is saved by the first image encryption apparatus 100, to the decrypted image 901, but generates image data of approximate image of the marker-covered images 605 by, for example, performing image interpolation as illustrated in FIG. 12 discussed later. An obtained image is not perfectly coincident with the original image 301 because image data for the marker-covered images 605 is generated by performing image interpolation. However, the obtained image (approximate image) is approximately the same image as the original image 301.

Third Embodiment

Image Decryption Apparatus that Switches Image Restoration Method

A third image decryption apparatus has a characteristic in that the restoration method of image is switched, which is different from the first image decryption apparatus 200 and the second image decryption apparatus 1000. The data of the marked encrypted image 701 encrypted by the first image encryption apparatus 100 is saved with the data of the marker-covered images 605. However, when the marked encrypted image 701 is printed or edited, there is a possibility that the marker-covered images 605 are disappeared. Consequently, it is preferable to switch the restoration method as discussed bellow. That is, when the marker-covered images 605 is available, the original image 301 before encryption is obtained by utilizing the marker-covered images 605, and when the marker-covered images 605 is unavailable, the original image 301 is approximately restored.

Figure 11:
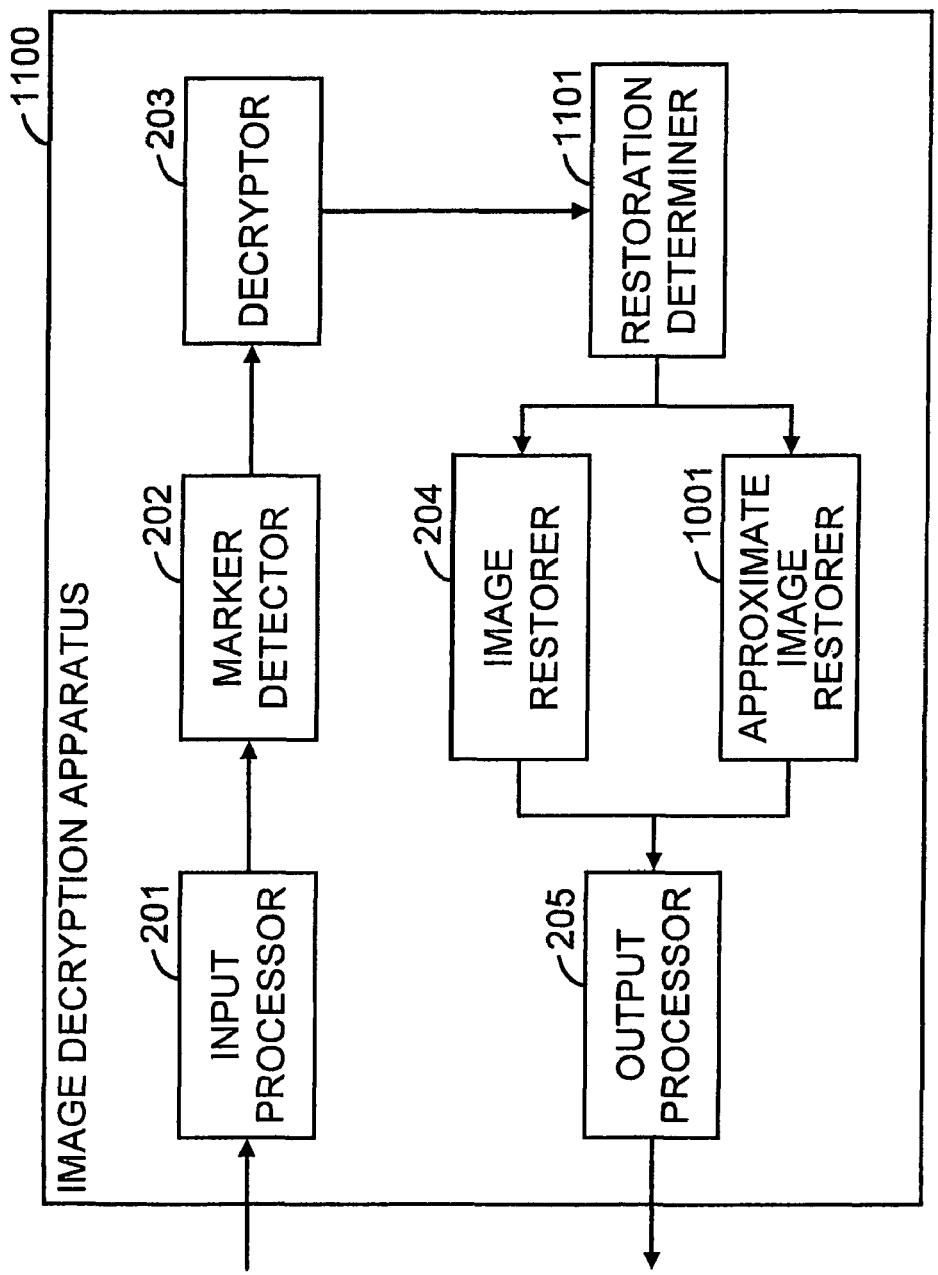
FIG. 11 is a diagram illustrating a system configuration of a third image decryption apparatus according to a third embodiment of the present invention.

FIG. 11 is a diagram illustrating a system configuration of a third image decryption apparatus according to a third embodiment of the present invention. Compared to the first image decryption apparatus 200 and the second image decryption apparatus 1000, the third image decryption apparatus 1100 includes both the image restorer 204 and the approximate image restorer 1001, and further includes a restoration determiner 1101. The restoration determiner 1101 determines whether the marker-covered images 605 are available. When available, the marker-covered images 605 are restored by the image restorer 204 and when unavailable, the marker-covered images 605 are approximately restored by the approximate image restorer 1001.

Marker_1 Capable of Approximate Restoration

In the second image decryption apparatus 1000 and the third image decryption apparatus 1100, the marker-covered images 605 are approximately restored. Accordingly, when there is a possibility of restoring an approximate image, it is preferable for the marker generator 103 of the first image encryption apparatus 100 to generate markers convenient for approximate restoration.

The approximate restoration is performed on the basis of image interpolation. FIG. 12 is a diagram illustrating an example of a marker according to embodiments of the present invention. For example, as illustrated in FIG. 12, when a marker 1201 is a line thin enough, in a decrypted image 1202, the marker 1201 may be erased and a marker-covered image may be approximately restored by image interpolation 1203 based on values of pixels that sandwich the marker 1201.

Figure 26:
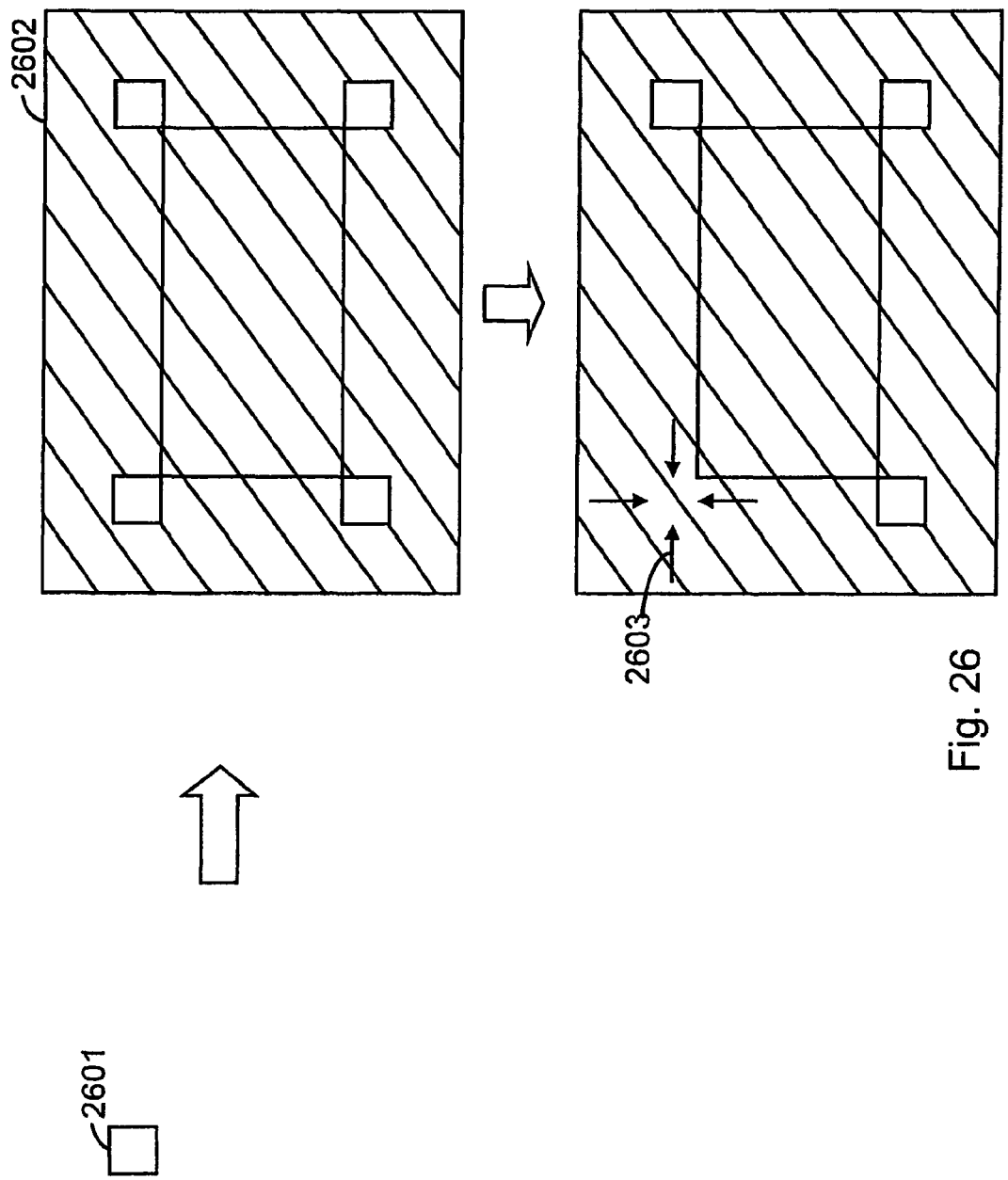
FIG. 26 is a diagram illustrating an example of a marker according to embodiments of the present invention.

FIG. 26 is a diagram illustrating an example of a marker according to embodiments of the present invention. Alternatively, a point-like small graphic 2601 as illustrated in FIG. 26 may be employed as a marker. In this case, an image interpolation 2603 as illustrated in FIG. 26 may be performed on a decrypted image 2602.

Marker_2 Capable of Approximate Restoration

A marker generated by the marker generator 103 is preferably a thin line or a small graphic so as to be convenient for approximate restoration. Consequently, there is a case that the marker is not printed with a sufficient accuracy due to severe deterioration of the printed marker. When the marker is disappeared, it becomes difficult to identify the position of the encrypted area, so that image decryption becomes extremely difficult.

Figure 13:
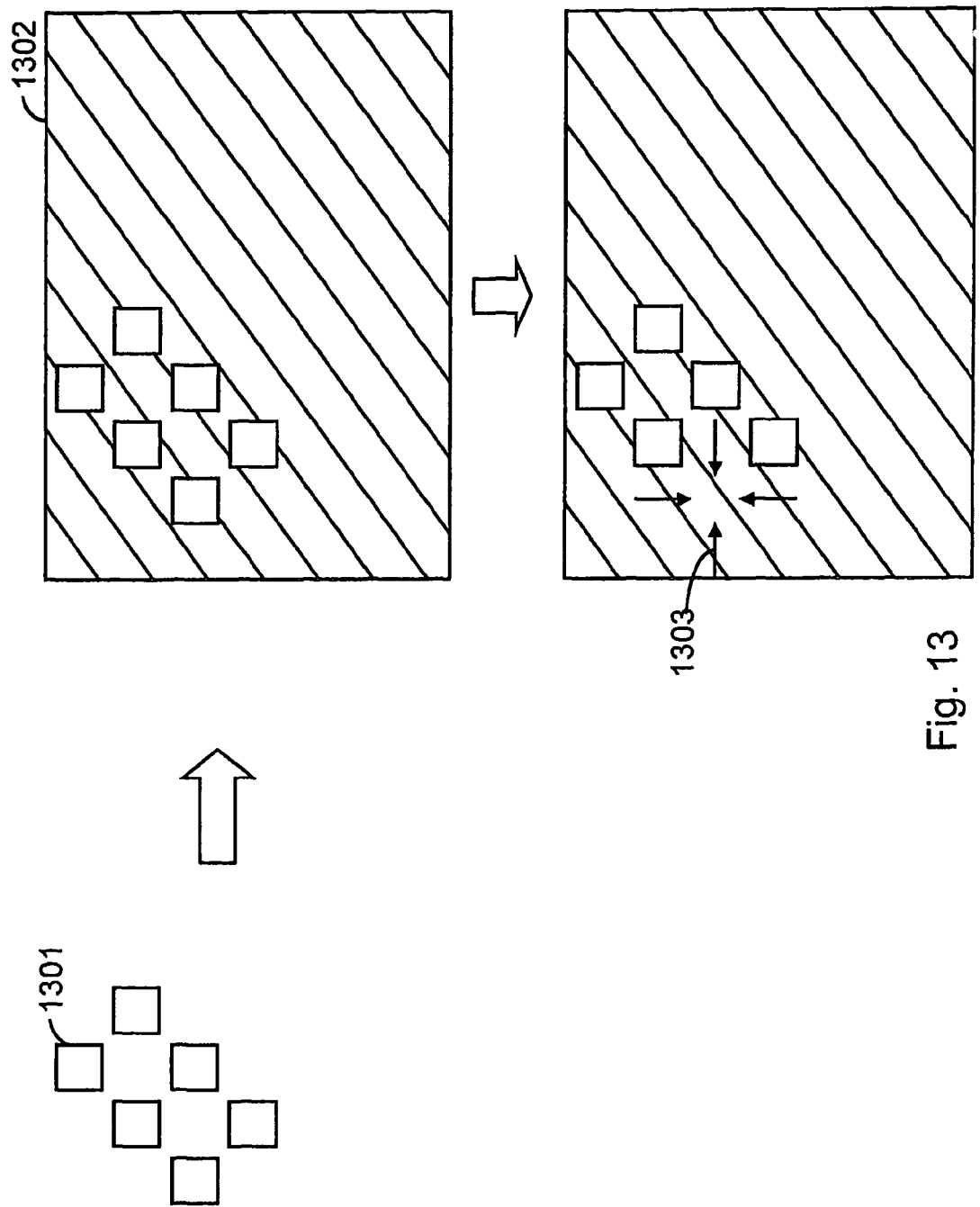
FIG. 13 is a diagram illustrating an example of a marker according to embodiments of the present invention.
Figure 14:
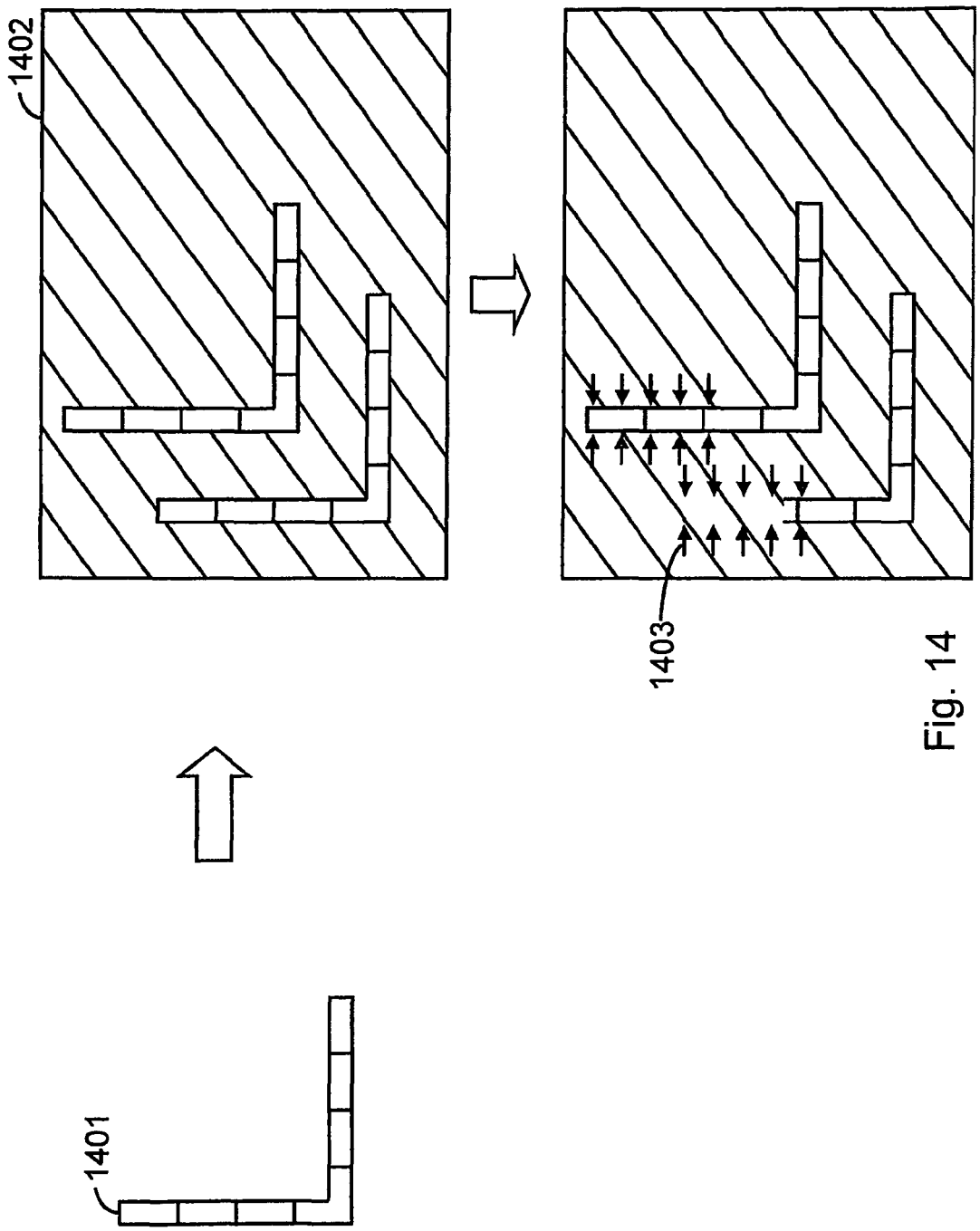
FIG. 14 is a diagram illustrating an example of a marker according to embodiments of the present invention.

FIGS. 13 and 14 illustrate other examples of a marker. As illustrated in FIG. 13 or FIG. 14, a plurality of small point-like markers 1301 or thin linear markers 1401 may preferably constitute one marker. Herewith, it may be possible to have a high printing resistance in erasing the marker on the decrypted image 1302 or 1402 and approximately restoring marker-covered images by image interpolation 1303 or 1404 based on values of pixels that sandwich the markers.

Marker_3 Capable of Approximate Restoration

A marker that is further strong against deterioration due to printing or the like may be generated.

Figure 15:
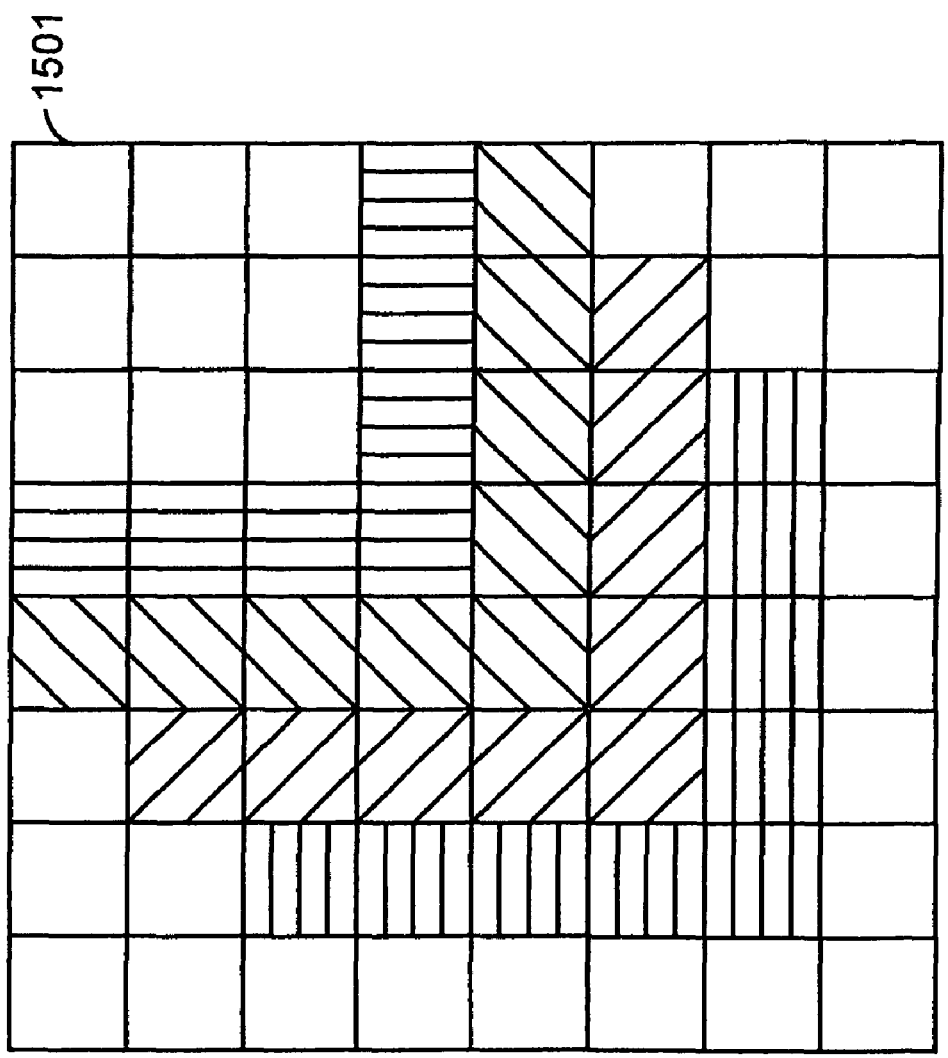
FIGS. 15 to 18 are diagrams illustrating an example of a method for generating a marker according to embodiments of the present invention.

FIGS. 15 to 18 are diagrams illustrating an example of a method for generating a marker according to embodiments of the present invention. A part of an image 1501 before markers are stuck thereto is illustrated in FIG. 15. An example of sticking markers thereto will be discussed.

Figure 16:
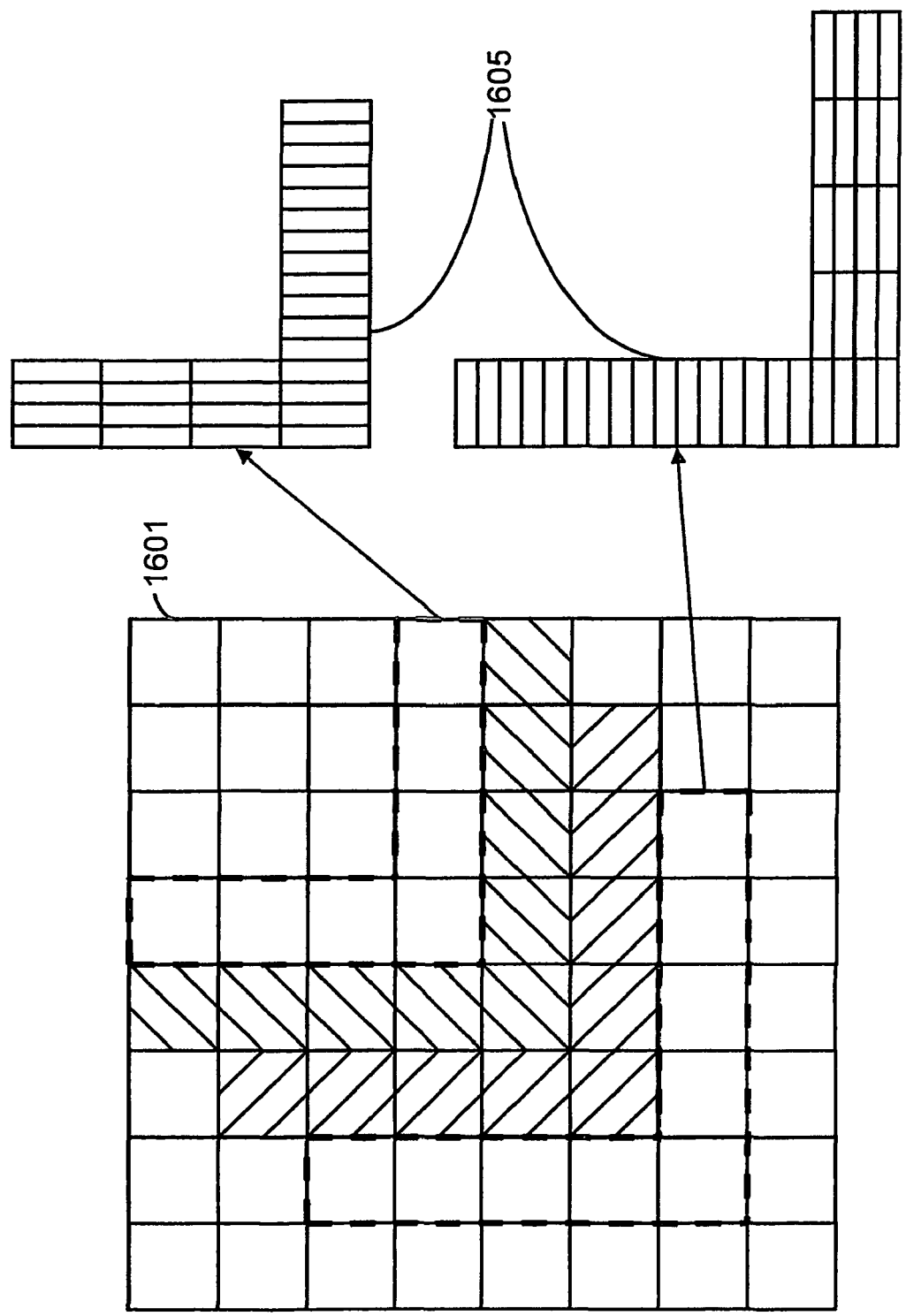
Figure 17:
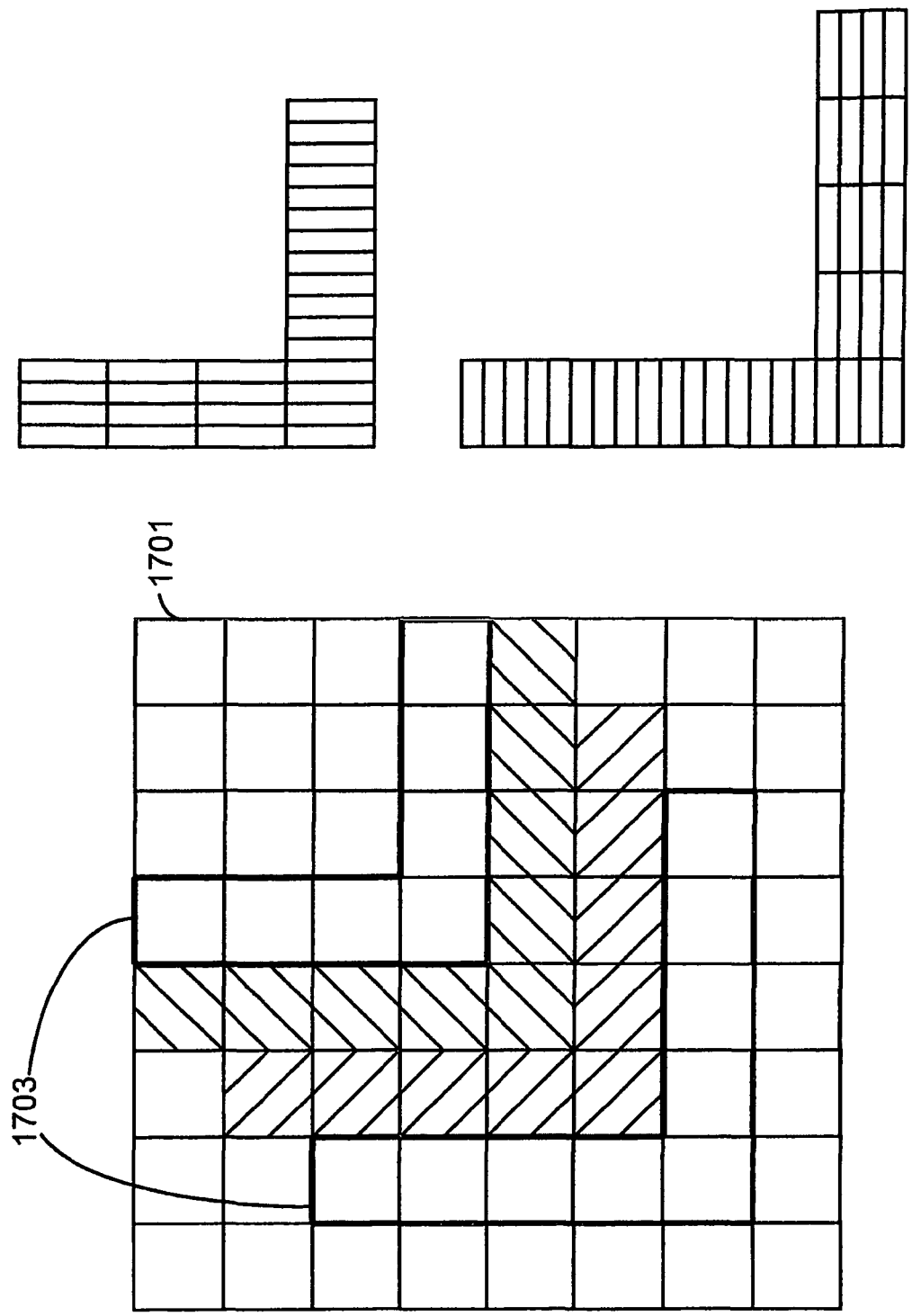

Marker-covered images 1605 are cut out from the image 1501 and an image 1601 is resulted as illustrated in FIG. 16. Then, two markers 1703 are stuck to the image 1601 to generate an image 1701, as illustrated in FIG. 17. The markers 1703 are the same as the markers 1401 illustrated in FIG. 14.

Figure 18:
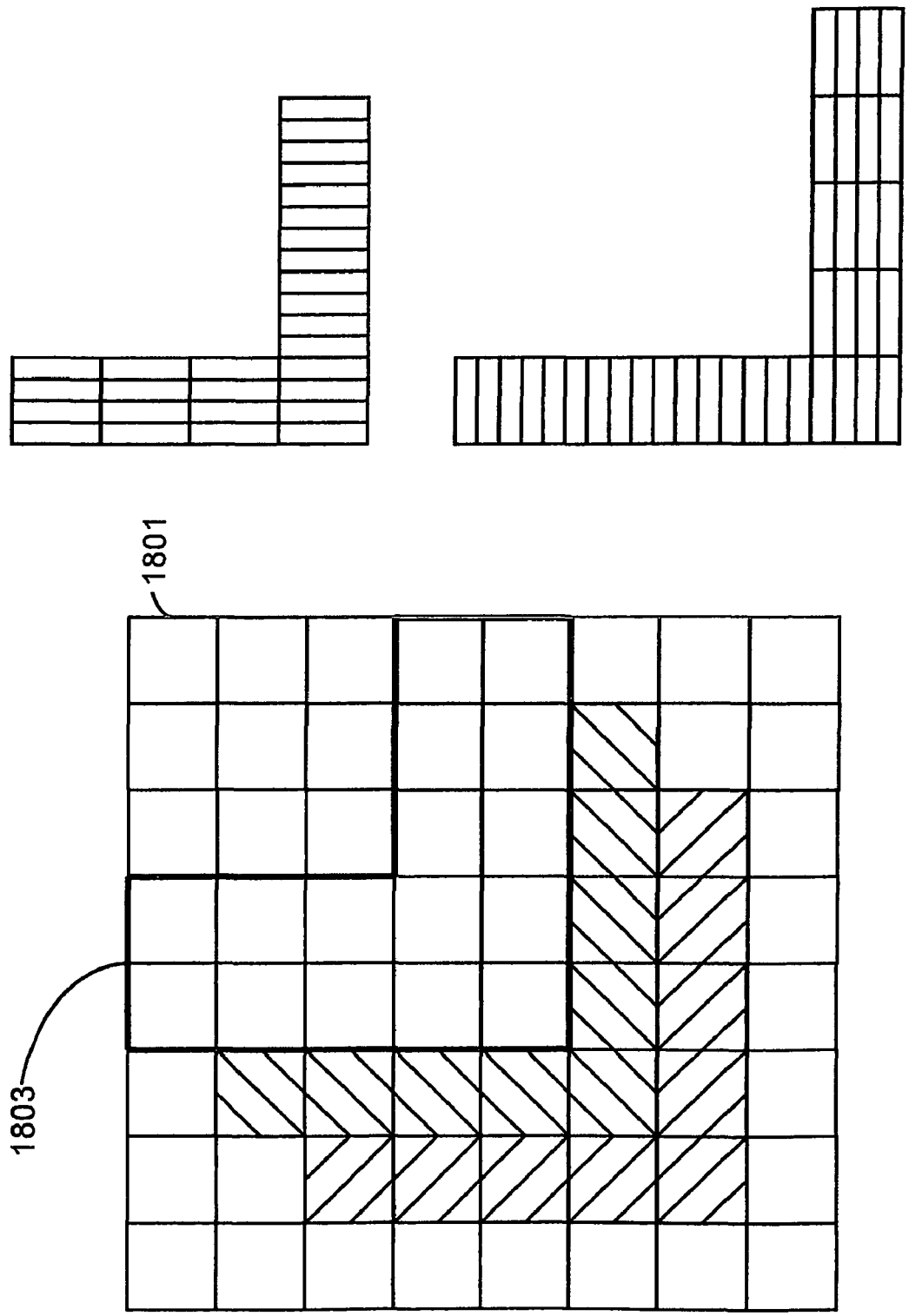

The marker generator 103 in this example generates a thicker and bigger marker 1803 by shifting and combining pixels and an image 1801 is resulted as illustrated in FIG. 18. To adversely obtain the image 1501 from the image 1801, the image 1701 may be obtained by shifting the pixels in the image 1801. The image 1601 may be obtained by erasing the markers 1703 from the image 1701. The image 1501 may be obtained by sticking the marker-covered images 1605 to the image 1601. Of course, the image 1501 may be obtained even when the marker-covered images 1605 are stuck to the image 1701.

Figure 19:
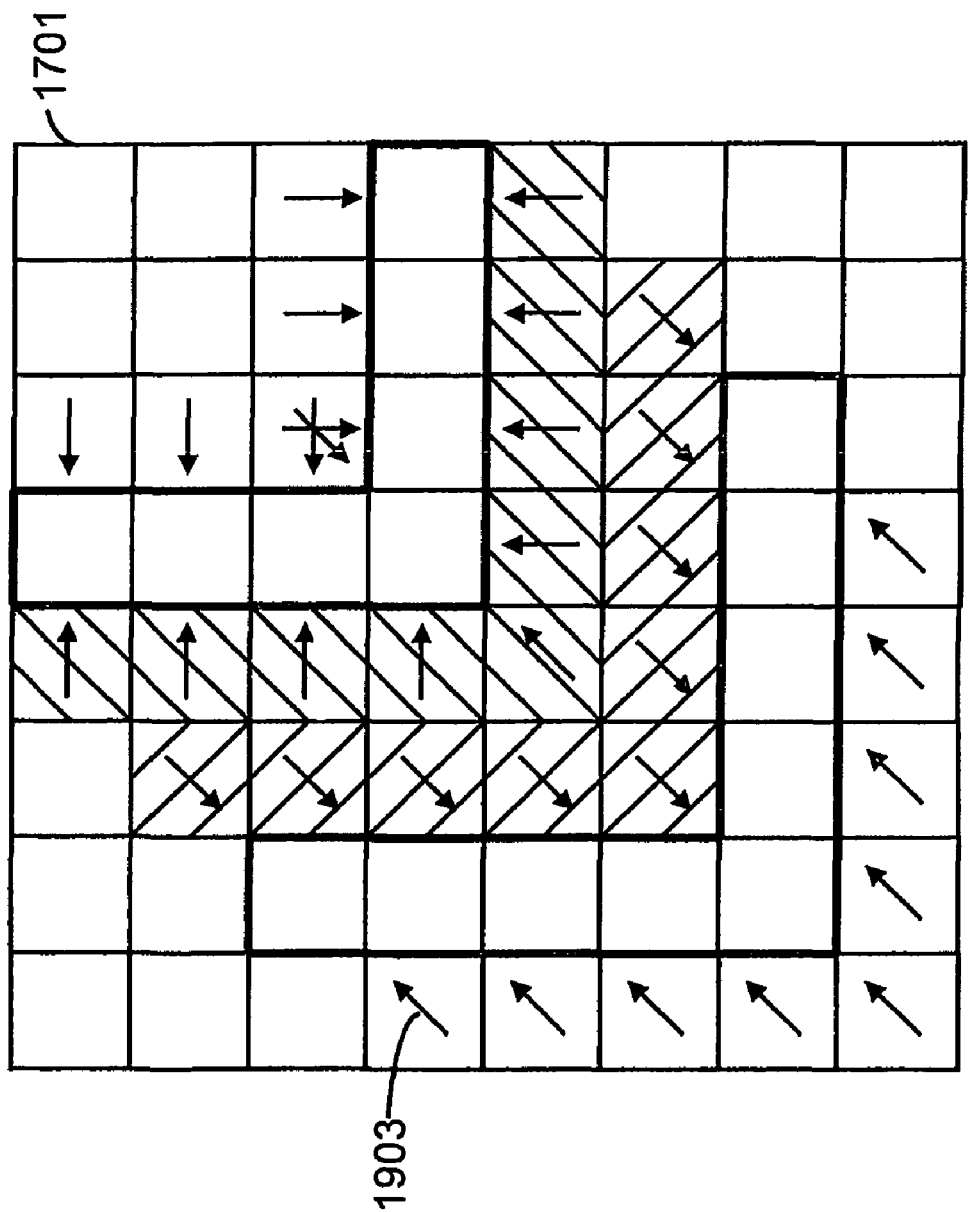
FIG. 19 is a diagram illustrating an example of image interpolation according to embodiments of the present invention.

FIG. 19 is a diagram illustrating an example of image interpolation according to embodiments of the present invention. To approximately restore the image 1501 from the image 1801, the image 1701 may be obtained by shifting pixels in the image 1801, and an image interpolation 1903 as illustrated in FIG. 19 may be performed on the image 1701.

As illustrated in FIGS. 15 to 19, it is possible to increase the size of the marker itself while providing approximate restoration. Accordingly, deterioration resistance is dramatically enhanced. Of course, as illustrated in FIGS. 15 to 19, a larger marker may be generated if the number of marker-covered images and markers stuck in FIG. 17 is increased to two or more.

Fourth Embodiment

Figure 20:
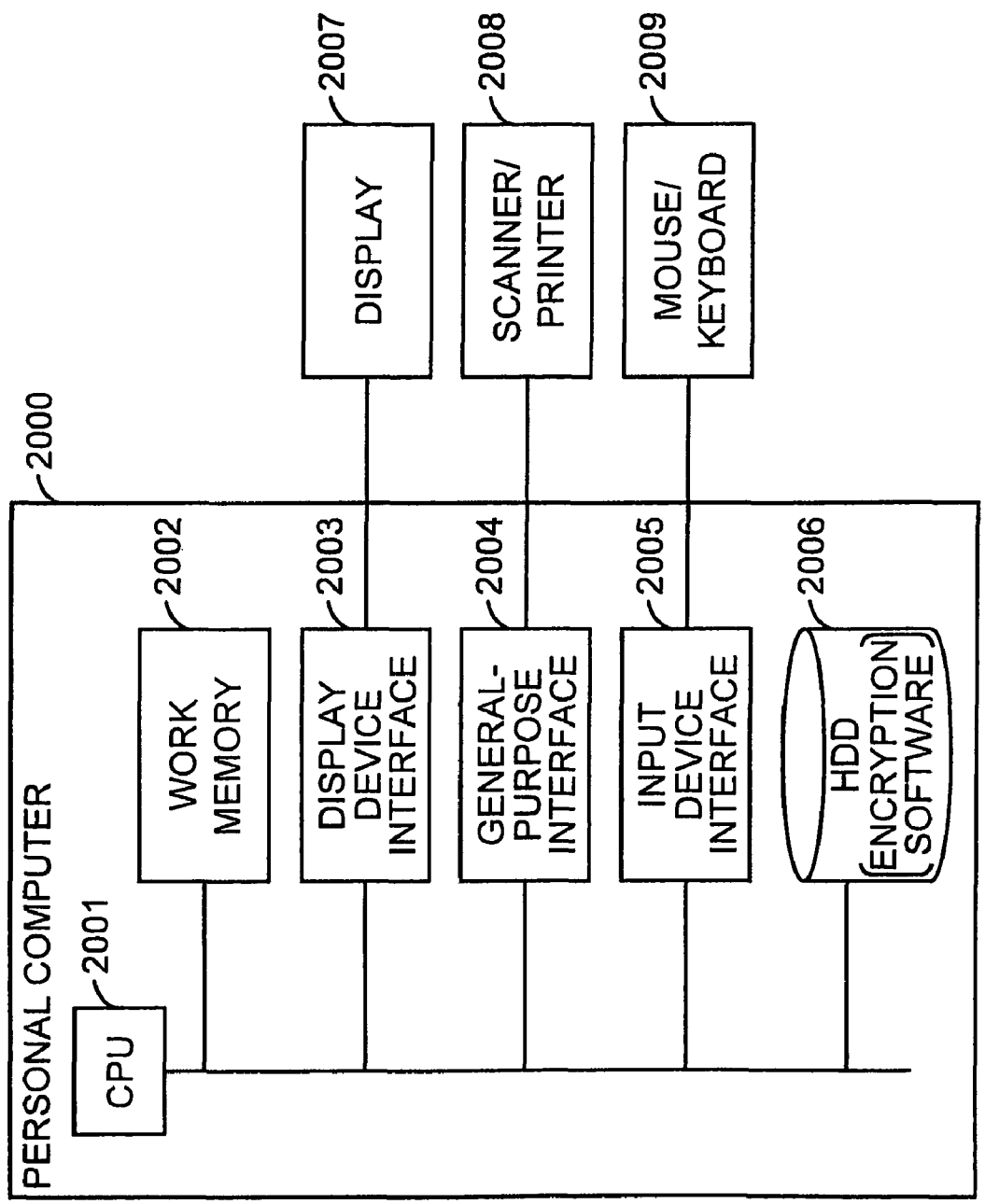
FIG. 20 is a diagram illustrating a system configuration of a personal computer according to a fourth embodiment of the present invention, which performs as a first image encryption apparatus illustrated in FIG. 1.

Embodiments for Providing First Image Encryption Apparatus with Personal Computer FIG. 20 is a diagram illustrating a system configuration of a personal computer according to a fourth embodiment of the present invention, which performs as a first image encryption apparatus illustrated in FIG. 1. As illustrated in FIG. 20, the personal computer 2000 includes a CPU (central processing unit) 2001, a work memory 2002, display device interface 2003, a general-purpose interface 2004, an input device interface 2005, and an HDD (hard disc drive) 2006.

The CPU 2001 performs the process of the first image encryption apparatus 100 illustrated in FIG. 1. Each element of the first image encryption apparatus 100 illustrated in FIG. 1 is encoded in a program in this case, and those programs are stored in the HDD 2006 as encryption software.

When a user activates the encryption software, the programs are loaded into the work memory 2002, and the program corresponding to each element of the first image encryption apparatus 100 illustrated in FIG. 1 is performed by the CPU 2001.

The user may load data of a printed matter into the work memory 2002 with a scanner/printer 2008 connected via the general-purpose interface 2004, or may load document data stored in the HDD 2006 into the work memory 2002 and perform an encryption process.

While looking a display 2007 connected via a display device interface 2003, the user may select an area for encryption and input a password with a mouse/keyboard 2009 connected via the input device interface 2005.

The encryption result may be printed by the scanner/printer 2008 connected via the general-purpose interface 2004 or may be stored in the HDD 2006.

Fifth Embodiment

Figure 21:
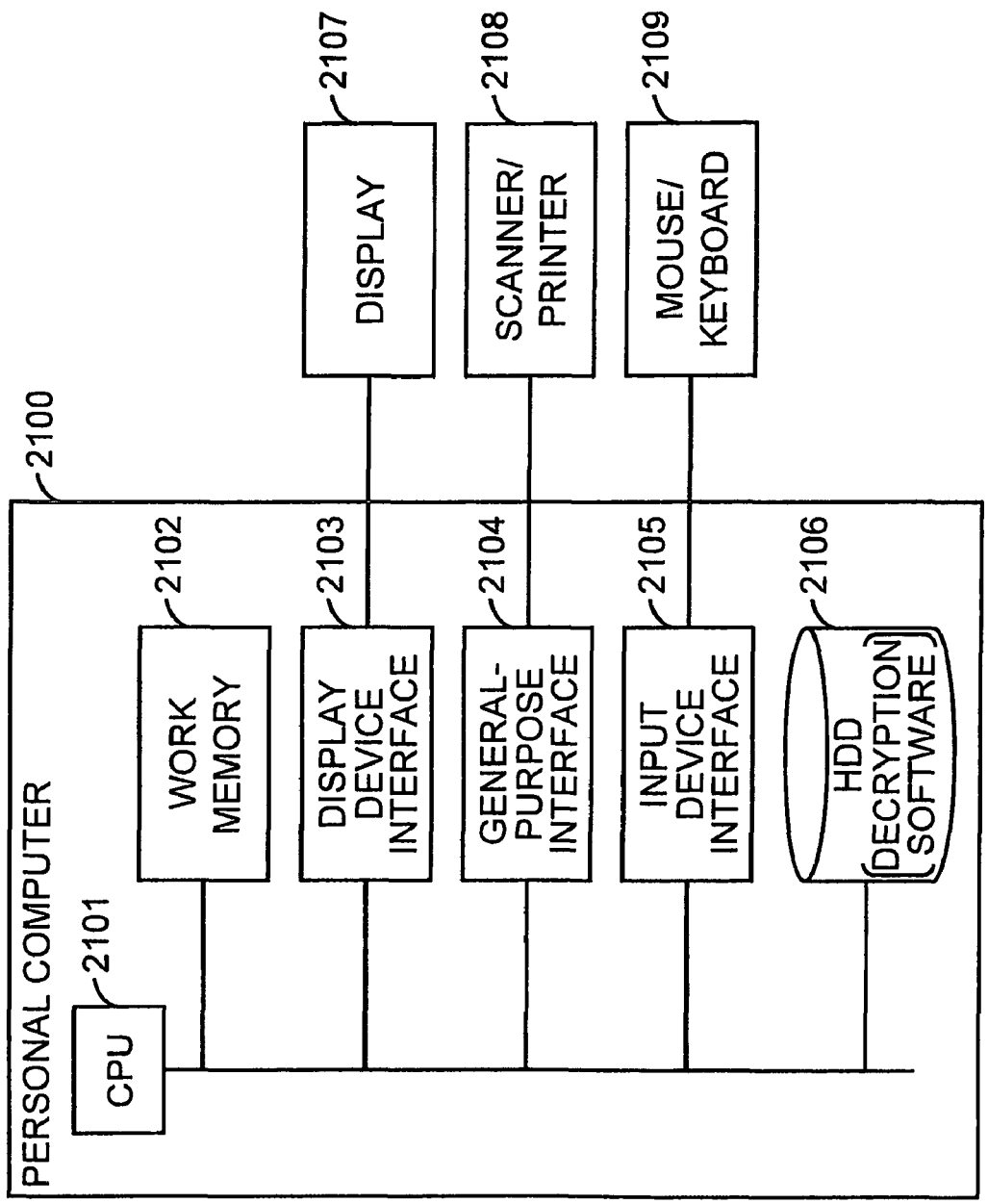
FIG. 21 is a diagram illustrating a system configuration of a personal computer according to a fifth embodiment of the present invention, which performs as a first, second, or third image decryption apparatus illustrated in FIG. 2, 10, or 11, respectively.

Embodiment for Providing First, Second, and Third Image Decryption Apparatus with Personal Computer FIG. 21 is a diagram illustrating a system configuration of a personal computer according to a fifth embodiment of the present invention, which performs as a first, second, or third image decryption apparatus illustrated in FIG. 2, 10, or 11, respectively. As illustrated in FIG. 21, the personal computer 2100 includes a CPU 2101, a work memory 2102, display device interface 2103, a general-purpose interface 2104, an input device interface 2105, and an HDD 2106.

Contrary to the HDD 2006 of the personal computer 2000, decryption software, in stead of the encryption software, is stored in the HDD 2106.

The CPU 2101 loads the decryption software stored in the HDD 2106 into the work memory 2102 to perform a decryption process.

A user may load data of a printed matter into the work memory 2102 with a scanner/printer 2108 connected via the general-purpose interface 2104, or may load document data stored in the HDD 2106 into the work memory 2102 and perform the decryption process.

When image data to be decrypted is loaded into the work memory 2102, the user may select an area for decryption and input a password with a mouse/keyboard 2109 connected via the input device interface 2105 while looking at a display 2107 connected via the display device interface 2103 to decrypt the data in the encrypted area.

The decrypted image may be printed by the scanner/printer 2108 connected via the general-purpose interface 2104, or may be stored in the HDD 2106.

Figure 22:
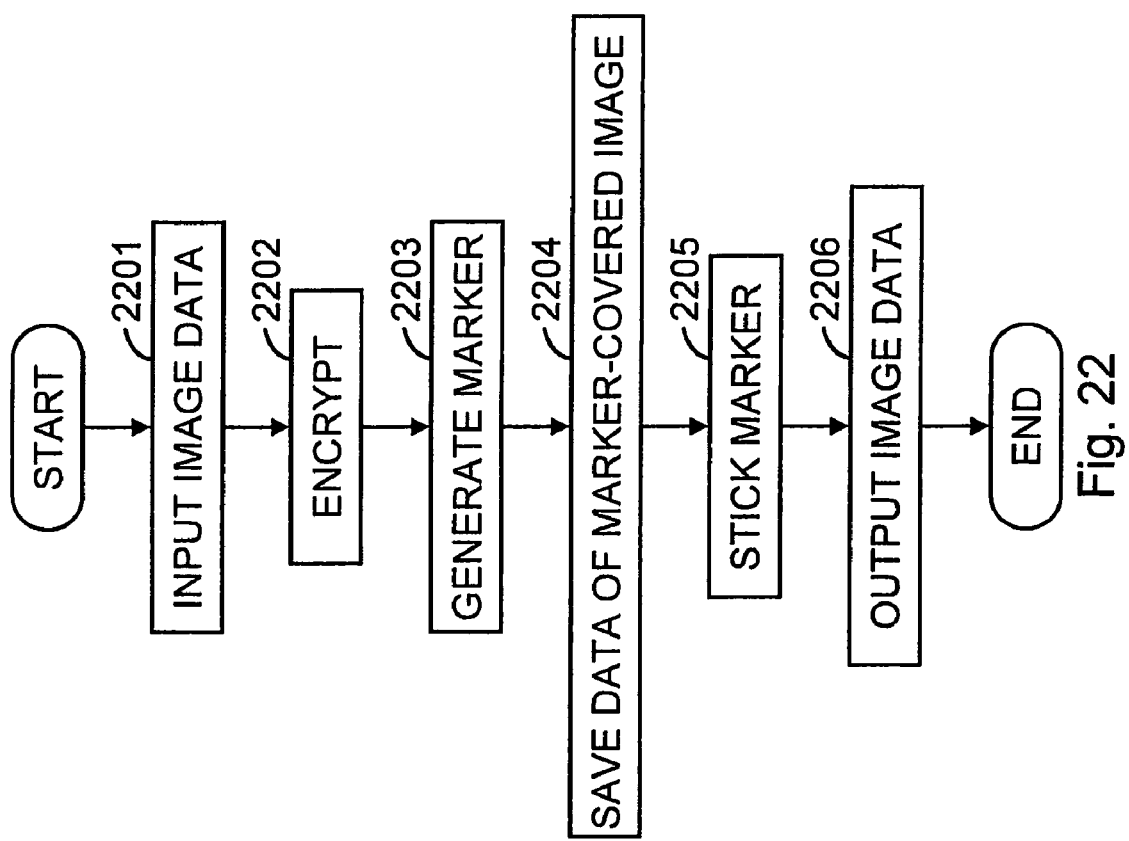
FIG. 22 is a flowchart illustrating a flow of an operation of a personal computer illustrated in FIG. 20, which performs as a first image encryption apparatus illustrated in FIG. 1.

Operational Flowchart of Personal Computer for Performing as First Image Encryption Apparatus FIG. 22 is a flowchart illustrating a flow of an operation of a personal computer illustrated in FIG. 21, which performs as a first image encryption apparatus illustrated in FIG. 1.

In operation 2201, image data of an original image 301 is input.

In operation 2202, coordinates of an encryption area specified by a user and an encryption key are loaded, and encryption process is applied on image data of the original image 301 in the encryption area with the encryption key.

In operation 2203, markers 503 are generated.

In operation 2204, data of the marker-covered images 605 are extracted and saved in advance.

In operation 2205, the markers 503 are stuck on the encrypted image 401.

In operation 2206, marked encrypted image 701 is output. The marker-covered images 605 may be stored in an area such as a header or a footer of the output image file.

Figure 23:
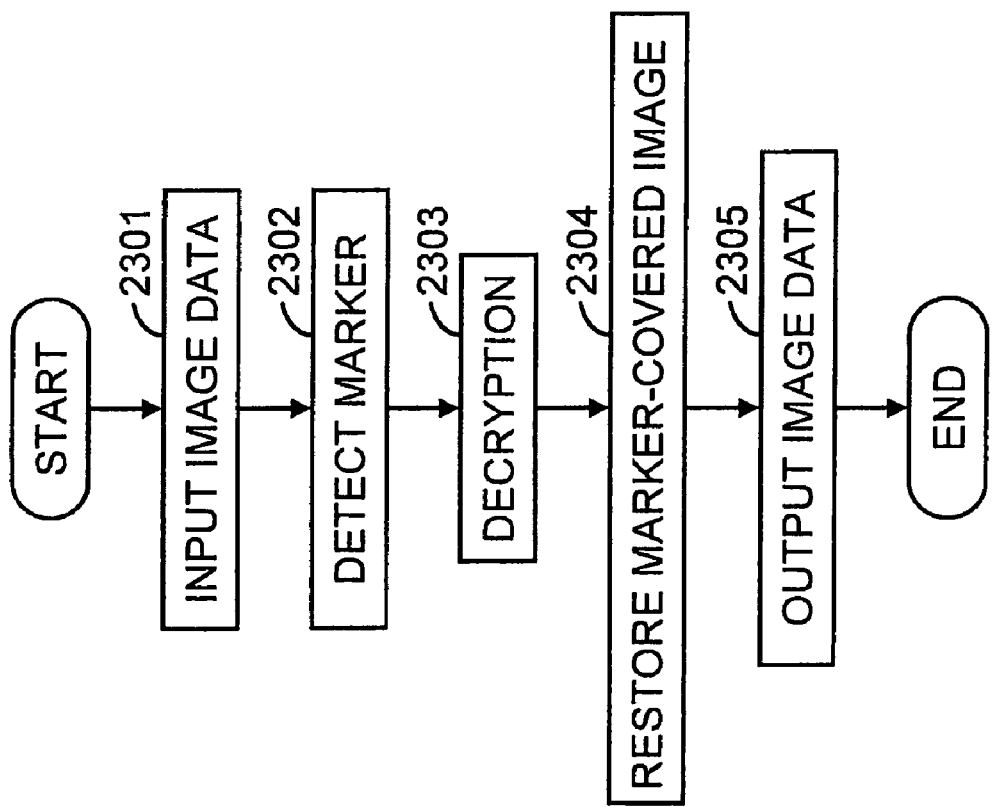
FIG. 23 is a flowchart illustrating a flow of an operation of a personal computer illustrated in FIG. 21, which performs as a first image decryption apparatus illustrated in FIG. 2.

Operational Flowchart of Personal Computer for Performing as First Image Decryption Apparatus FIG. 23 is a flowchart illustrating a flow of an operation of a personal computer illustrated in FIG. 21, which performs as a first image decryption apparatus illustrated in FIG. 2.

In operation 2301, image data of a marked encrypted image 701 is input.

In operation 2302, markers are detected and the position of the encrypted area 402 is identified.

In operation 2303, a decryption key is input and a decryption process is applied on image data of the marked encrypted image 701 in the encrypted area 402 with the decryption key.

In operation 2304, the original image 301 is restored by sticking, to marker areas, the marker-covered images 605 stored in a header or a footer of the input image file or a discrete file.

In operation 2305, the restored original image 301 is output.

Figure 24:
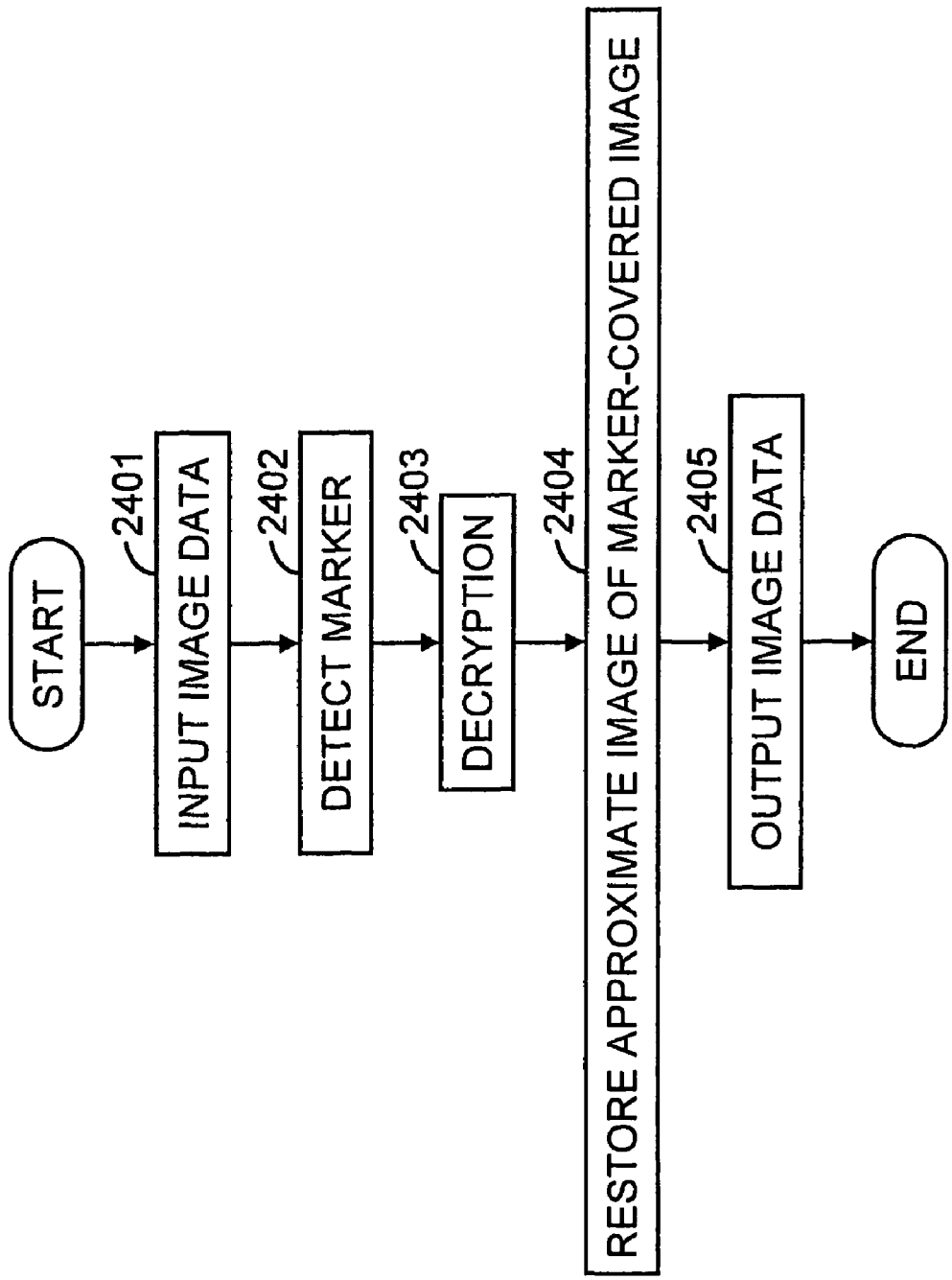
FIG. 24 is a flowchart illustrating a flow of an operation of a personal computer illustrated in FIG. 21, which performs as a second image decryption apparatus illustrated in FIG. 10.

Operational Flowchart of Personal Computer for Performing as Second Image Decryption Apparatus FIG. 24 is a flowchart illustrating a flow of an operation of a personal computer illustrated in FIG. 21, which performs as a second image decryption apparatus illustrated in FIG. 10.

In operation 2401, image data of a marked encrypted image 701 is input.

In operation 2402, markers are detected and the position of the encrypted area 402 is identified.

In operation 2403, a decryption key is input and a decryption process is applied on image data of the marked encrypted image 701 in the encrypted area 402 with the decryption key.

In operation 2404, the marker-covered images 605 are approximately restored by erasing markers and interpolating images or performing pixel shift, pixel combination, and image interpolation.

In operation 2405, the approximately restored original image 301 is output.

Figure 25:
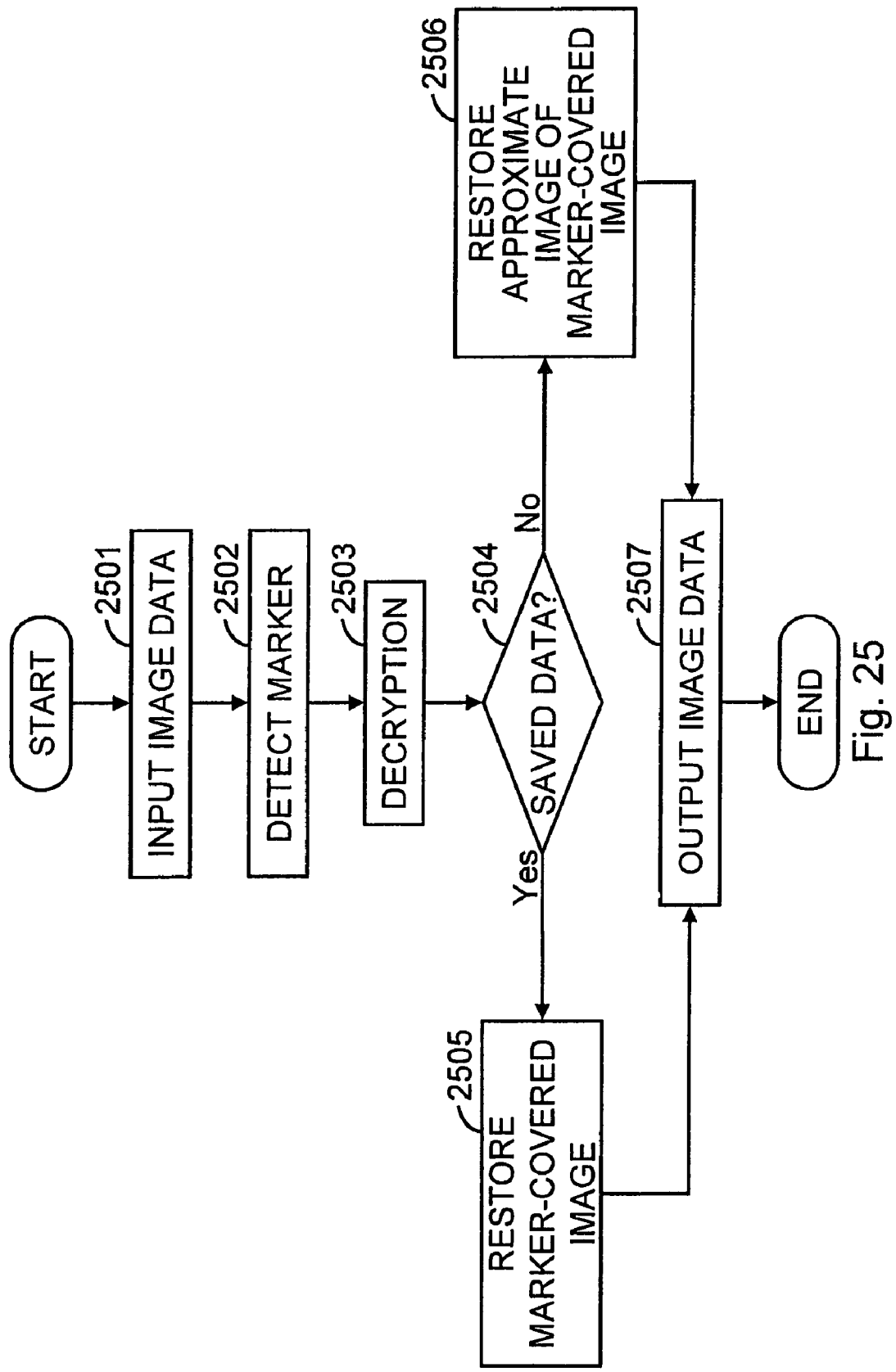
FIG. 25 is a flowchart illustrating a flow of an operation of a personal computer illustrated in FIG. 21, which performs as a third image decryption apparatus illustrated in FIG. 11.

Operational Flowchart of Personal Computer for Performing as Third Image Decryption Apparatus FIG. 25 is a flowchart illustrating a flow of an operation of a personal computer illustrated in FIG. 21, which performs as a third image decryption apparatus illustrated in FIG. 11.

In operation 2501, image data of a marked encrypted image 701 is input.

In operation 2502, markers are detected and the position of the encrypted area 402 is identified.

In operation 2503, a decryption key is input and a decryption process is applied on image data of the marked encrypted image 701 in the encrypted area 402 with the decryption key.

In operation 2504, it is checked whether data of the marker-covered images 605 has been saved.

In operation 2505, when the data of the marker-covered images 605 has been saved ("Yes" in operation 2504), the original image 301 is restored by sticking, to marker areas, the marker-covered images 605 stored in a header or a footer of the input image file or a discrete file.

In operation 2506, when the data of the marker-covered images 605 has not been saved ("No" in operation 2504), the marker-covered images 605 are approximately restored by erasing markers and interpolating images or performing pixel shift, pixel combination, and image interpolation.

In operation 2507, the restored or approximately restored original image 301 is output.

Example of Storing Marker-Covered images in Digital Image File

Next, an example of storing marker-covered images in a digital image file will be discussed.

Figure 27:
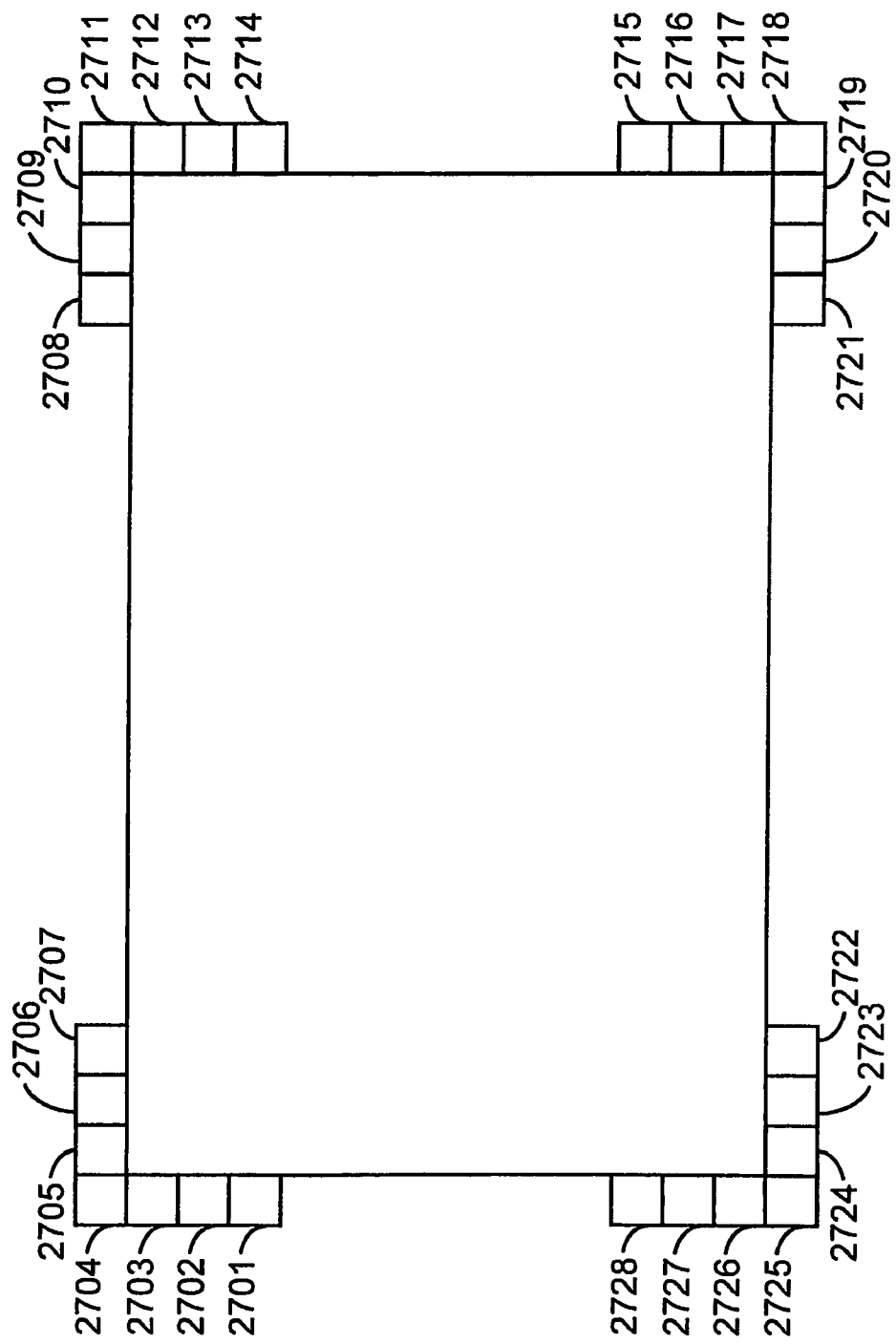
FIG. 27 is a diagram illustrating an example of arrangement of markers according to embodiments of the present invention.

FIG. 27 is a diagram illustrating an example of arrangement of markers according to embodiments of the present invention. In FIG. 27, four markers are arranged around an encrypted area. For the sake of simplicity, it is assumed that each of the four markers is one pixel wide and seven pixels long. Accordingly, there are 28 pixels from a pixel 2701 to a pixel 2728 in FIG. 27.

FIG. 28 is a diagram illustrating an example of data arrangement of marker-covered images stored in a digital image file. Pixel values of the pixels 2701 to 2728 of the four markers are arranged in line. Of course, the data amount of the embedded data illustrated in FIG. 28 may be reduced by using a lossless compression such as a run-length compression or an entropy compression.

Figure 29:
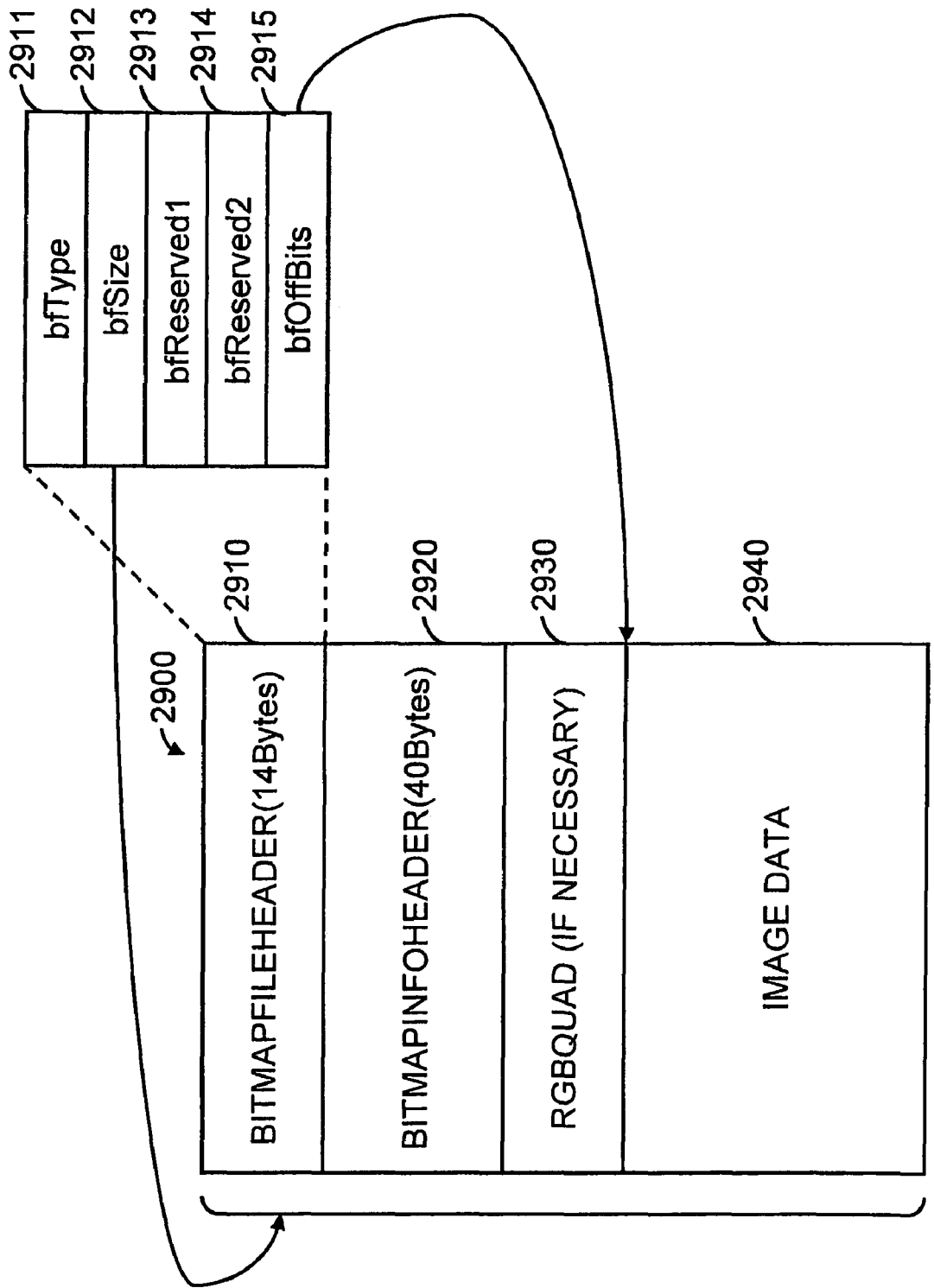
FIG. 29 is a diagram illustrating a header structure of a bitmap file.

FIG. 29 is a diagram illustrating a header structure of a bitmap file. FIGS. 30A and 30B are diagrams illustrating an example in which data illustrated in FIG. 28 is embedded in a bitmap file. Next, an example will be discussed with reference to FIGS. 29, 30A, and 30B, in which the data illustrated in FIG. 28 is actually stored in a bitmap file.

As illustrated in FIG. 29, a bitmap file 2900 includes a BITMAPFILEHEADER (BMP file header) 2910, a BITMAPINFOHEADER (bitmap information) 2920, an RGBQUAD (color palette) 2930, and a bitmap data block 2940. The BITMAPFILEHEADER 2910 includes a bfType (file type identification) 2911, a bfSize (file size) 2912, a bfReserved1 (reserved) 2913, a bfReserved2 (reserved) 2914, and a bfOffBits (offset of the bitmap data) 2915. The bfSize 2912 stores a size of the whole BMP file in bytes. The bfOffBits 2915 stores the offset, i.e. starting address, of the byte where the bitmap data can be found.

In order to embed the data of marker-covered images, the bfSize 2912 is focused.

As illustrated in FIG. 30A, bfSize 3001 of original image file is 0x01743F06 (byte). Therefore, a relative address of the last byte 3002 of the image data is 0x01743f06.

As illustrated in FIG. 30B, embedded data 3005 is added to end of the original file. The extended size 3004 due to adding the embedded data 3005 is 0x0AA6 (byte)=2,726 (byte).

At this time, the bfSize 3001 is rewritten to bfSize 3003 with original bfSize 3001+extended size 3004=0x017449AC. Although the manner of embedding varies depending on a data format, embedding the data of marker-covered images into image file in other data format such as JPEG (Joint Photographic Experts Group) or TIFF (Tag Image File Format) is also possible by skillfully operating the header data.

All examples and conditional language recited herein are intended for pedagogical purposes to aid the reader in understanding the present invention and the concepts contributed by the inventor to furthering the art, and are to be construed as being without limitation to such specifically recited examples and conditions, nor does the organization of such examples in the specification relate to a showing of the superiority and inferiority of the present invention. Although the embodiment(s) of the present inventions have been discussed in detail, it should be understood that the various changes, substitutions, and alterations could be made hereto without departing from the spirit and scope of the present invention.

What is claimed is:

1. An image encryption apparatus for encrypting image data, comprising:
   an input processor for accepting data of an input image to be encrypted; an encryptor for encrypting data in a predefined encryption area of the input image to generate data of a first encrypted image, said first encrypted image being the input image whose data in the predefined encryption area has been replaced with encrypted data;
   a marker generator for generating data of a marker to be stuck on the first encrypted image, said marker being capable of indicating the predefined encryption area of the first encrypted image;
   an image saver for saving data of a part of the first encrypted image where the marker is to be stuck;
   a marker sticker for generating data of a second encrypted image, said second encrypted image being the first encrypted image whose data in the part has been replaced with the data of the marker; and
   an output processor for outputting the data of the second encrypted image.

2. The image encryption apparatus of claim 1, wherein said marker is a graphic thin enough for data of an image covered with said graphic to be interpolated.

3. The image encryption apparatus of claim 1, wherein said marker is an assemble of graphics, said graphic being thin enough for data of an image covered with said graphic to be interpolated, said assemble of graphics being rearranged so that the graphics are adjacent each other to form a thicker marker.

4. An image decryption apparatus for decrypting image data, comprising:
   an input processor for accepting data of an input image to be decrypted;
   a marker detector for detecting a marker stuck on the input image and identifying an encrypted area of the input image on the basis of a detected marker;
   a decryptor for decrypting data in the encrypted area of the input image to generate data of a first decrypted image, said first decrypted image being the input image whose data in the encrypted area has been replaced with decrypted data;
   an image restorer for generating data of a second decrypted image, said second decrypted image is the first decrypted image whose data in an area covered with the marker has been restored; and
   an output processor for outputting the data of the second decrypted image,
   wherein said image restorer retrieves data of an image in the area covered with the marker, and replaces data of the first decrypted image in the area covered with the marker with retrieved data to generate the data of the second decrypted image.

5. The image decryption apparatus of claim 4, wherein said image restorer interpolates data of an image in the area covered with the marker, and replaces data of the first decrypted image in the area covered with the marker with interpolated data to generate the data of the second decrypted image.

6. The image decryption apparatus of claim 4, further comprising:
   a restoration determiner for determining whether data of the image in the area covered with the marker is available,
   wherein
   when the restoration determiner has determined that the data of the image in the area covered with the marker is available, said image restorer retrieves the data of the image in the area covered with the marker, and replaces data of the first decrypted image in the area covered with the marker with retrieved data to generate the data of the second decrypted image, and
   when the restoration determiner has determined that the data of the image in the area covered with the marker is unavailable, said image restorer interpolates data of the image in the area covered with the marker, and replaces data of the first decrypted image in the area covered with the marker with interpolated data to generate the data of the second decrypted image.

7. The image decryption apparatus of claim 4, wherein said marker is a graphic thin enough for data of an image covered with said graphic to be interpolated.

8. The image decryption apparatus of claim 4, wherein said marker is an assemble of graphics, said graphic being thin enough for data of an image covered with said graphic to be interpolated, said assemble of graphics being rearranged so that the graphics are adjacent each other to form a thicker marker.

9. A non-transitory computer-readable medium encoded with computer-executable instructions enabling a computer to function as:
   an input processor for accepting data of an input image to be encrypted;
   an encryptor for encrypting data in a predefined encryption area of the input image to generate data of a first encrypted image, said first encrypted image being the input image whose data in the predefined encryption area has been replaced with encrypted data;
   a marker generator for generating data of a marker to be stuck on the first encrypted image, said marker being capable of indicating the predefined encryption area of the first encrypted image;
   an image saver for saving data of a part of the first encrypted image where the marker is to be stuck;
   a marker sticker for generating data of a second encrypted image, said second encrypted image being the first encrypted image whose data in the part has been replaced with the data of the marker; and
   an output processor for outputting the data of the second encrypted image.

10. A non-transitory computer-readable medium encoded with computer-executable instructions enabling a computer to function as:
    an input processor for accepting data of an input image to be decrypted;
    a marker detector for detecting a marker stuck on the input image and identifying an encrypted area of the input image on the basis of a detected marker;

a decryptor for decrypting data in the encrypted area of the input image to generate data of a first decrypted image, said first decrypted image being the input image whose data in the encrypted area has been replaced with decrypted data;

an image restorer for generating data of a second decrypted image, said second decrypted image is the first decrypted image whose data in an area covered with the marker has been restored; and an output processor for outputting the data of the second decrypted image, wherein said image restorer retrieves data of an image in the area covered with the marker, and replaces data of the first decrypted image in the area covered with the marker with retrieved data to generate the data of the second decrypted image.

11. The computer-readable medium of claim 10, wherein said image restorer interpolates data of an image in the area covered with the marker, and replaces data of the first decrypted image in the area covered with the marker with interpolated data to generate the data of the second decrypted image.

12. The computer-readable medium of claim 10, said computer-executable instructions enabling the computer to further function as:

a restoration determiner for determining whether data of the image in the area covered with the marker is available, wherein when the restoration determiner has determined that the data of the image in the area covered with the marker is available, said image restorer retrieves the data of the image in the area covered with the marker, and replaces data of the first decrypted image in the area covered with the marker with retrieved data to generate the data of the second decrypted image, and when the restoration determiner has determined that the data of the image in the area covered with the marker is unavailable, said image restorer interpolates data of the image in the area covered with the marker, and replaces data of the first decrypted image in the area covered with the marker with interpolated data to generate the data of the second decrypted image.

13. An image encryption method performed by an image encryption apparatus for encrypting image data, said image encryption method comprising:

accepting data of an input image to be encrypted;

encrypting data in a predefined encryption area of the input image to generate data of a first encrypted image, said first encrypted image being the input image whose data in the predefined encryption area has been replaced with encrypted data;

generating data of a marker to be stuck on the first encrypted image, said marker being capable of indicating the predefined encryption area of the first encrypted image;

saving data of a part of the first encrypted image where the marker is to be stuck;

generating data of a second encrypted image, said second encrypted image being the first encrypted image whose data in the part has been replaced with the data of the marker; and outputting the data of the second encrypted image.

14. An image decryption method performed by an image decryption apparatus for decrypting image data, said image decryption method comprising:

accepting data of an input image to be decrypted;

detecting a marker stuck on the input image;

identifying an encrypted area of the input image on the basis of a detected marker;

decrypting data in the encrypted area of the input image to generate data of a first decrypted image, said first decrypted image being the input image whose data in the encrypted area has been replaced with decrypted data;

generating data of a second decrypted image, said second decrypted image is the first decrypted image whose data in an area covered with the marker has been restored; and outputting the data of the second decrypted image, wherein said generating data of a second decrypted image is performed by:

retrieving data of an image in the area covered with the marker, and replacing data of the first decrypted image in the area covered with the marker with retrieved data to generate the data of the second decrypted image.

15. The image decryption method of claim 14, wherein said operation of generating data of a second decrypted image is performed by:

interpolating data of an image in the area covered with the marker, and replacing data of the first decrypted image in the area covered with the marker with interpolated data to generate the data of the second decrypted image.

16. The image decryption method of claim 14, further comprising:

determining whether data of the image in the area covered with the marker is available, wherein when it is determined that the data of the image in the area covered with the marker is available, said operation of generating data of a second decrypted image is performed by: retrieving the data of the image in the area covered with the marker, and replacing data of the first decrypted image in the area covered with the marker with retrieved data to generate the data of the second decrypted image, and when it is determined that the data of the image in the area covered with the marker is unavailable, said operation of generating data of a second decrypted image is performed by: interpolating data of the image in the area covered with the marker, and replacing data of the first decrypted image in the area covered with the marker with interpolated data to generate the data of the second decrypted image.

* * * * *